(12) United States Patent
Ting et al.

(10) Patent No.: US 9,090,999 B2
(45) Date of Patent: Jul. 28, 2015

(54) POLYAMIDE/POLYPHENYLENE ETHER FIBERS AND FIBER-FORMING METHOD

(75) Inventors: Sai-Pei Ting, Slingerlands, NY (US); Olivier Guise, Albany, NY (US); Jung Ah Lee, Rensselaer, NY (US); Richard H. Peters, Dalton, MA (US); Hua Guo, Selkirk, NY (US)

(73) Assignee: SABIC GLOBAL TECHNOLOGIES B.V. (NL)

( * ) Notice: Subject to any disclaimer, the term of this patent is extended or adjusted under 35 U.S.C. 154(b) by 0 days.

(21) Appl. No.: 13/247,344

(22) Filed: Sep. 28, 2011

(65) Prior Publication Data

US 2013/0078465 A1    Mar. 28, 2013

(51) Int. Cl.
| | | |
|---|---|---|
| *D02G 3/00* | (2006.01) | |
| *B28B 3/20* | (2006.01) | |
| *C08F 283/04* | (2006.01) | |
| *D01F 6/94* | (2006.01) | |
| *C08L 77/02* | (2006.01) | |
| *C08L 77/06* | (2006.01) | |
| *B29C 47/00* | (2006.01) | |
| *D01F 1/10* | (2006.01) | |
| *D01F 6/90* | (2006.01) | |
| *D01F 8/12* | (2006.01) | |
| *B29C 47/92* | (2006.01) | |
| *C08L 71/12* | (2006.01) | |

(52) U.S. Cl.
CPC .............. *D01F 6/94* (2013.01); *B29C 47/0014* (2013.01); *B29C 47/92* (2013.01); *C08L 71/12* (2013.01); *C08L 77/02* (2013.01); *C08L 77/06* (2013.01); *D01F 1/10* (2013.01); *D01F 6/90* (2013.01); *D01F 8/12* (2013.01); *B29C 2947/92514* (2013.01); *B29C 2947/92704* (2013.01); *Y10T 428/2929* (2015.01)

(58) Field of Classification Search
CPC ......................................................... C08J 3/005
USPC ........................................ 428/373; 264/176.1
See application file for complete search history.

(56) References Cited

U.S. PATENT DOCUMENTS

| | | | |
|---|---|---|---|
| 2,071,250 A | 2/1937 | Carothers | |
| 2,071,251 A | 2/1937 | Carothers | |
| 2,130,523 A | 9/1938 | Carothers | |
| 2,130,948 A | 9/1938 | Carothers | |

(Continued)

FOREIGN PATENT DOCUMENTS

| | | |
|---|---|---|
| DE | 4129499 A1 | 3/1993 |
| EP | 0344590 A2 | 12/1989 |

(Continued)

OTHER PUBLICATIONS

Non-Final Office Action for U.S. Appl. No. 13/037,429, filed Mar. 1, 2011; Date of Notification Sep. 25, 2012; 17 pages.

(Continued)

*Primary Examiner* — Peter Y Choi
*Assistant Examiner* — Christine Rea
(74) *Attorney, Agent, or Firm* — Cantor Colburn LLP

(57) ABSTRACT

A fiber is prepared by melt extruding a composition including specific amounts of a polyamide and a polyphenylene ether along with a compatabilizer. Particular combinations produce fibers having a desirable combination of good tenacity and low denier per fiber. Compared to a fiber prepared from polyamide alone, the present fiber exhibits improved heat resistance and flame resistance.

23 Claims, 22 Drawing Sheets

(56) References Cited

U.S. PATENT DOCUMENTS

| | | | |
|---|---|---|---|
| 2,241,322 A | 5/1941 | Hanford | |
| 2,312,966 A | 3/1943 | Hanford | |
| 2,512,606 A | 6/1950 | Bolton et al. | |
| 3,306,874 A | 2/1967 | Hay | |
| 4,970,272 A | 11/1990 | Gallucci | |
| 5,000,897 A | 3/1991 | Chambers | |
| 5,132,365 A | 7/1992 | Gallucci | |
| 5,225,270 A | 7/1993 | Bhoori et al. | |
| 5,227,109 A | 7/1993 | Allen, III et al. | |
| 5,260,359 A | 11/1993 | Muehlbach et al. | |
| 5,304,593 A | 4/1994 | Nishio et al. | |
| 5,334,444 A * | 8/1994 | Bhoori et al. | 442/324 |
| 5,357,003 A | 10/1994 | Smits et al. | |
| 5,380,477 A | 1/1995 | Kent et al. | |
| 5,458,972 A | 10/1995 | Hagen | |
| 5,559,194 A | 9/1996 | Kotek et al. | |
| 5,561,193 A | 10/1996 | Gottschalk et al. | |
| 5,612,112 A | 3/1997 | Kotek et al. | |
| 5,618,885 A | 4/1997 | Kotek et al. | |
| 5,623,024 A | 4/1997 | Kotek et al. | |
| 5,750,603 A | 5/1998 | Asrar | |
| 5,824,763 A * | 10/1998 | Pagilagan | 528/322 |
| 6,015,510 A | 1/2000 | Jacobson et al. | |
| 6,025,419 A | 2/2000 | Kasowski et al. | |
| 6,043,315 A | 3/2000 | Gottschalk et al. | |
| 6,093,771 A | 7/2000 | Wunsch et al. | |
| 6,166,115 A | 12/2000 | Landa | |
| 6,593,411 B2 | 7/2003 | Koevoets et al. | |
| 7,087,666 B2 | 8/2006 | Hoerold et al. | |
| 7,132,063 B2 | 11/2006 | Elkovitch et al. | |
| 7,148,276 B2 | 12/2006 | Bauer et al. | |
| 7,226,963 B2 | 6/2007 | Koevoets et al. | |
| 7,255,814 B2 | 8/2007 | Hoerold et al. | |
| 7,259,200 B2 | 8/2007 | Bauer et al. | |
| 7,273,901 B2 | 9/2007 | Sicken et al. | |
| 7,332,534 B2 | 2/2008 | Knop et al. | |
| 7,439,288 B2 | 10/2008 | Sicken et al. | |
| 7,449,508 B2 | 11/2008 | Steib et al. | |
| 7,585,935 B2 | 9/2009 | Hossan et al. | |
| 7,666,500 B2 | 2/2010 | Magill et al. | |
| 7,838,580 B2 | 11/2010 | Bauer et al. | |
| 7,847,032 B2 | 12/2010 | Guo et al. | |
| 8,017,697 B2 | 9/2011 | Carrillo et al. | |
| 2003/0092824 A1* | 5/2003 | Bastiaens et al. | 524/495 |
| 2004/0176506 A1 | 9/2004 | Sicken et al. | |
| 2004/0225040 A1 | 11/2004 | Hoerold | |
| 2005/0038171 A1 | 2/2005 | Elkovitch et al. | |
| 2005/0142325 A1 | 6/2005 | Veurink et al. | |
| 2006/0020064 A1 | 1/2006 | Bauer et al. | |
| 2006/0058432 A1 | 3/2006 | Perego et al. | |
| 2006/0089435 A1 | 4/2006 | Hoerold et al. | |
| 2006/0093818 A1* | 5/2006 | Bansal et al. | 428/364 |
| 2006/0208239 A1 | 9/2006 | Bauer et al. | |
| 2007/0015899 A1 | 1/2007 | Lee | |
| 2007/0244231 A1 | 10/2007 | Borade et al. | |
| 2009/0030141 A1 | 1/2009 | Balfour et al. | |
| 2009/0068463 A1* | 3/2009 | Mochizuki et al. | 428/370 |
| 2009/0146109 A1* | 6/2009 | Elkovitch et al. | 252/500 |
| 2009/0211967 A1 | 8/2009 | Delsman et al. | |
| 2009/0256119 A1* | 10/2009 | Bastiaens et al. | 252/519.33 |
| 2009/0318635 A1 | 12/2009 | Carrillo et al. | |
| 2010/0173139 A1 | 7/2010 | Miyoshi et al. | |
| 2010/0233458 A1 | 9/2010 | Sun et al. | |
| 2011/0003962 A1 | 1/2011 | Carrillo et al. | |
| 2011/0152420 A1 | 6/2011 | Elkovitch et al. | |
| 2011/0152431 A1 | 6/2011 | Elkovitch et al. | |
| 2011/0152471 A1 | 6/2011 | Kamalakaran et al. | |
| 2011/0319552 A1* | 12/2011 | Bastiaens et al. | 524/538 |
| 2012/0329961 A1 | 12/2012 | Carrillo et al. | |

FOREIGN PATENT DOCUMENTS

| | | |
|---|---|---|
| JP | 02855272 B2 | 2/1999 |
| JP | 2004190156 A | 7/2004 |
| JP | 2008138120 A | 6/2008 |
| WO | 9711123 A1 | 3/1997 |
| WO | 9808898 A1 | 3/1998 |
| WO | 2011134623 A1 | 11/2011 |
| WO | 2012007124 A1 | 1/2012 |
| WO | 2011134622 A1 | 3/2012 |

OTHER PUBLICATIONS

U.S. Appl. No. 13/169,137, filed Jun. 27, 2011.
U.S. Appl. No. 13/650,352, filed Oct. 12, 2012.
U.S. Appl. No. 13/650,366, filed Oct. 12, 2012.
DE3834086 A1, Apr. 19, 1990, Abstract Only, 2 pages.
JP2010018906 A, Jan. 28, 2010, Abstract Only, 1 page.
Vydyne 21ZLV, Product Data Sheet, downloaded from http://53af052f81856517219b-5c898576c0a79c837f1ed1d0ad49d31c.r80.cf1.rackcdn.com/949F8095-64A7-ECED-713C-C80E3E51227D on Jun. 1, 2012, 1 page.
JP2008069478, Mar. 27, 2008, Abstract, 2 pages.
International Search Report for International Application No. PCT/IB2011/050892; International Filing Date Mar. 12, 2011; Date of Mailing Jul. 12, 2011; 5 pages.
Non-Final Office Action for U.S. Appl. No. 13/037,429, filed Mar. 1, 2011; Date of Notification May 25, 2012; 12 pages.
DE4129499A1; Mar. 11, 1993; Machine Translation; 25 pages.
EP0344590A2; Dec. 6, 1989; Machine Translation; 9 pages.
EP0529378 A1, Mar. 3, 1993, Abstract Only, 1 page.
International Search Report for International Application No. PCT/US2012/054132, International Application Filing Date Sep. 7, 2012, Date of Mailing Feb. 27, 2013, 6 pages.
Written Opinion for International Application No. PCT/US2012/054132, International Application Filing Date Sep. 7, 2012, Date of Mailing Feb. 27, 2013, 4 pages.
Non Final Office Action dated Apr. 29, 2014; U.S. Appl. No. 13/037,429, filed Mar. 1, 2011.
Non Final Office Action dated Apr. 10, 2014; U.S. Appl. No. 13/650,352, filed Oct. 12, 2012.
Kutz, Handbook of Materials Selection, 2002, John Wiley & Sons, p. 343.
International Search Report; International Application No. PCT/US2013/057310; International Filing Date Aug. 29, 2013; 6 pages.
Written Opinion; International Application No. PCT/US2013/057310; International Filing Date Aug. 29, 2013; 6 pages.
Final Office Action for U.S. Appl. No. 13/037,429, filed Mar. 1, 2011, Notification Date Dec. 16, 2013, 12 pages.
Final Office Action for U.S. Appl. No. 13/037,429, filed Mar. 1, 2011, Notification Date Jan. 31, 2013, 22 pages.
Non-Final Office Action for U.S. Appl. No. 13/037,429, filed Mar. 1, 2011, Notification Date Jun. 6, 2013, 17 pages.
J. Bicerano, Ph.D., "A Practical Guide to Polymeric Compatibilizers for Polymer Blends, Composites and Laminates." SpecialChem; Dec. 2005; 2 pgs.
International Search Report for International Application No. PCT/US2013/056610, International Application Filing Date Aug. 26, 2013; Date of Mailing Nov. 18, 2013, 6 pages.
Written Opinion for International Application No. PCT/US2013/056610, International Application Filing Date Aug. 26, 2013; Date of Mailing Nov. 18, 2013, 6 pages.
Final Office Action dated Sep. 10, 2014; U.S. Appl. No. 13/037,429, filed Mar. 1, 2011.
Non Final Office Action dated Jun. 19, 2014; U.S. Appl. No. 13/650,366, filed Oct. 12, 2012; 42 pages.
Non-Final Office Action dated Jan. 29, 2015; U.S. Appl. No. 13/650,352, filed Oct. 12, 2012 (21 pages).
International Search Report for International Application No. PCT/IB2011/050892; International Filing Date Mar. 2, 2011; Date of Mailing Jul. 12, 2011; 5 pages.
Written Opinion for International Application No. PCT/IB2011/050892; International Filing Date Mar. 2, 2011; Date of Mailing Jul. 12, 2011; 7 pages.
European Search Report dated Apr. 23, 2015; EP Publication No. 2761067; Publication Date Aug. 6, 2014 (5 pages).

* cited by examiner

POLYAMIDE/POLYPHENYLENE ETHER FIBERS AND FIBER-FORMING METHOD

BACKGROUND OF THE INVENTION

Nylon fibers are widely used in such diverse applications as carpets, ropes, parachutes, and tires. However, for some applications, including electrical insulation and fabric for protective clothing, there is a desire for nylon fibers exhibiting increased heat resistance, increased flame resistance, reduced moisture absorption, or some combination of these properties.

It was previously reported that the incompatibility of polyphenylene ether and polyamide led to difficulties in producing fibers. For example, U.S. Pat. Nos. 5,225,270 and 5,334,444 to Bhoori et al., and U.S. Pat. No. 5,559,194 to Kotek et al. disclose compositions that attempt to address this problem by requiring the addition of a third polymer component into the blend in order to produce polyphenylene ether/polyamide fibers. Specifically, U.S. Pat. Nos. 5,225,270 and 5,334,444 to Bhoori et al. require the addition of a functionalized olefinic elastomer, defined as having an ASTM D638 tensile modulus of less than about 40,000 pounds per square inch (276 megapascals). U.S. Pat. No. 5,225,270 to Bhoori et al., column 6, lines 15-19; U.S. Pat. No. 5,334,444 to Bhoori et al., column 7, lines 5-17. Useful functionalized olefinic elastomers include block and graft elastomers of one or more of ethylene, propylene, butylene, isopropylene, and isobutylene. U.S. Pat. No. 5,225,270 to Bhoori et al., column 6, lines 20-23; U.S. Pat. No. 5,334,444 to Bhoori et al., column 7, lines 18-21. And U.S. Pat. No. 5,559,194 to Kotek et al. requires the addition of a miscible amorphous polymer selected from polyamides prepared from terephthalic acid and 2,2,4-trimethylhexamethylene-diamine, polyamides prepared from terephthalic acid and 2,4,4-trimethylhexamethylenediamine, and polyamides prepared from hexamethylenediamine, isophthalic acid, and terephthalic acid. U.S. Pat. No. 5,559,194 to Kotek et al., column 2, lines 30-34.

There is a desire for simpler polyamide-polyphenylene ether compositions suitable for fiber spinning.

BRIEF SUMMARY OF THE INVENTION

The present inventors have determined that fibers of superior strength and smoothness can be prepared from blends of polyphenylene ether and polyamide without the addition of a third polymer component. The present invention therefore permits the simplification of the number of polymers that must be blended together in order to make fibers from polyamide-polyphenylene ether blends.

In addition, the invention limits the cross-sectional area of the largest particles of polyphenylene ether, which would otherwise lead to inefficiencies in the melt spinning of polyphenylene ether/polyamide fibers, for example due to the increased pack pressure and clogging of spinneret pores which such large dimension particles produce. By reducing the frequency at which such excessive pressure and clogging occur, the current invention allows the melt spinning process for polyphenylene ether/polyamide fibers to be run more efficiently with reduced stoppages required to maintain the melt spinning production process.

In some embodiments of the present invention the polyamide fiber may have a desirable reduced gloss without the need for addition of gloss-reducing additives such as titanium dioxide. The fibers produced according to the invention have very consistent dimensions and surface smoothness, however the overall average surface gloss of the fibers of the invention is significantly less than that of nylon fibers produced without gloss-reduction additives. This aspect of the invention allows the production of polyamide fibers of acceptable gloss levels at a reduced weight per unit volume, which is greatly advantageous in fuel savings both in the shipping of the fiber product and long term fuel savings in transportation end uses such as vehicle interiors.

One embodiment is a fiber comprising a compatibilized polyamide-polyphenylene ether blend, wherein the compatibilized polyamide-polyphenylene ether blend is the product of melt blending components comprising: about 40 to about 95 weight percent of a polyamide having an amine end group concentration of less than or equal to 100 microequivalents per gram; about 5 to about 60 weight percent of a polyphenylene ether having an intrinsic viscosity of from about 0.2 to about 0.38 and about 0.35 to about 1.2 weight percent of a compatibilizing agent; wherein all weight percents are based on the total weight of the polyamide-polyphenylene ether polymers; wherein the compatibilized polyamide-polyphenylene ether blend comprises a continuous phase comprising the polyamide, and a disperse phase comprising the polyphenylene ether; wherein the mean cross-sectional area of the disperse phase particles is less than or equal to about 0.7 micrometer$^2$, and no more than 0.5 percent of the total disperse phase particles have a cross-sectional area of greater than 5.5 micrometer$^2$, based on the number of disperse phase particles, when measured by scanning transmission electron microscopy [for example, by employing a scanning electron microscope in scanning electron transmission microscopy mode, also referred to as "STEM-in-SEM"] in the absence of added polyphenylene ether swelling solvent such as toluene; and wherein the compatibilized polyamide-polyphenylene ether blend is essentially free of: a) functionalized olefinic elastomer; b) a polyamide prepared from: 1) a diamine selected from the group consisting of 2,2,4-trimethylhexamethylenedi-amine, hexamethylenediamine, and mixtures thereof, and 2) a diacid selected from the group consisting of isophthalic acid, terephthalic acid, and mixtures thereof; and c) a block copolymer of an alkenyl aromatic compound and a conjugated diene.

Another embodiment is a method of melt spinning a fiber, comprising: melt extruding a compatibilized polyamide-polyphenylene ether blend to form a fiber; wherein the compatibilized polyamide-polyphenylene ether blend is the product of melt blending components comprising about 40 to about 95 weight percent of a polyamide having an amine end group concentration of less than or equal to 100 microequivalents per gram, about 5 to about 60 weight percent of a polyphenylene ether having an intrinsic viscosity of about 0.2 to about 0.35, and about 0.35 to about 1.2 weight percent of a compatibilizing agent, wherein all weight percents are based on the total weight of the polyamide-polyphenylene ether polymers; wherein the compatibilized polyamide-polyphenylene ether blend comprises a continuous phase comprising the polyamide, and a disperse phase comprising the polyphenylene ether; wherein the mean cross-sectional area of the disperse phase particles is less than or equal to about 0.7 micrometer$^2$, and no more than 0.5 percent of the total disperse phase particles have a cross-sectional area of greater than 5.5 micrometer$^2$, based on the number of disperse phase particles, when measured by scanning transmission electron microscopy [for example, by employing a scanning electron microscope in scanning electron transmission microscopy mode, also referred to as "STEM-in-SEM"] in the absence of added polyphenylene ether swelling solvent such as toluene; and wherein the compatibilized polyamide-polyphenylene ether blend is essentially free of: a) functionalized olefinic elastomer, and b) a polyamide prepared from: 1) a diamine selected from the group consisting of 2,2,4-trimethylhexamethylenediamine, hexamethylenediamine, and mixtures thereof, and 2) a diacid selected from the group consisting of isophthalic acid, terephthalic acid, and mixtures thereof; and c) a block copolymer of an alkenyl aromatic compound and a conjugated diene.

Another embodiment is a core/sheath fiber comprising: a core comprising a polyamide and being substantially free of polyphenylene ether; and a sheath substantially surrounding the core and comprising a compatibilized polyamide-polyphenylene ether blend; wherein the compatibilized polyamide-polyphenylene ether blend is the product of melt blending components comprising about 50 to about 89.5 weight percent of a polyamide having an amine end group concentration of less than or equal to 100 microequivalents per gram; about 10 to about 49.5 weight percent of a polyphenylene ether having an intrinsic viscosity of about 0.24 to about 0.38, and about 0.35 to about 1 weight percent of a compatibilizing agent, wherein all weight percents are based on the total weight of the polyamide-polyphenylene ether polymers; wherein the polyamide is selected from the group consisting of polyamide-6, polyamide-6,6, and mixtures thereof; wherein the polyamide has an amine end group concentration of less than or equal to 100 microequivalents per gram; wherein the polyphenylene ether has an intrinsic viscosity of from about 0.2 to about 0.4 deciliter per gram, measured at 25° C. in chloroform; wherein the compatibilized polyamide-polyphenylene ether blend comprises a continuous phase comprising the polyamide, and a disperse phase comprising the polyphenylene ether; wherein the mean cross-sectional area of the disperse phase particles is less than or equal to about 0.7 micrometer$^2$, and no more than 0.5 percent of the total disperse phase particles have a cross-sectional area of greater than 5.5 micrometer$^2$, based on the number of disperse phase particles, when measured in the absence of added polyphenylene ether swelling solvent such as toluene; and wherein the compatibilized polyamide-polyphenylene ether blend is essentially free of: a) functionalized olefinic elastomer and b) a polyamide prepared from: 1) a diamine selected from the group consisting of 2,2,4-trimethylhexamethylenediamine, hexamethylenediamine, and mixtures thereof; and 2) a diacid selected from the group consisting of isophthalic acid, terephthalic acid, and mixtures thereof; and c) a block copolymer of an alkenyl aromatic compound and a conjugated diene.

Another embodiment is a core/sheath fiber comprising: a core comprising a compatibilized polyamide-polyphenylene ether blend; and a sheath substantially surrounding the core and comprising a polyamide and being substantially free of polyphenylene ether.

These and other embodiments are described in detail below.

DETAILED DESCRIPTION OF THE INVENTION

Figure 1:
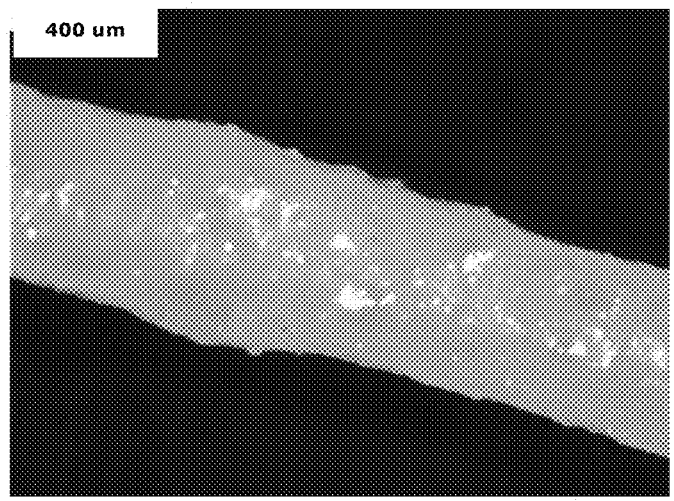
FIG. 1 is an optical micrograph of a section of an extrudate strand prepared from the Comparative Example 1 composition.
Figure 2:
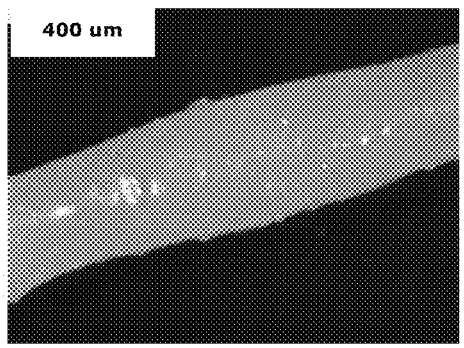
FIG. 2 is an optical micrograph of a section of extrudate strand prepared from the Comparative Example 3 composition.
Figure 3:
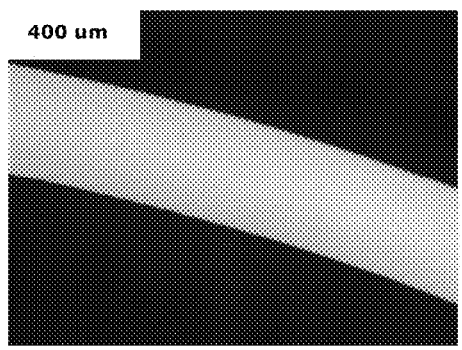
FIG. 3 is an optical micrograph of a section of extrudate strand prepared from the Comparative Example 6 composition.
Figure 4:
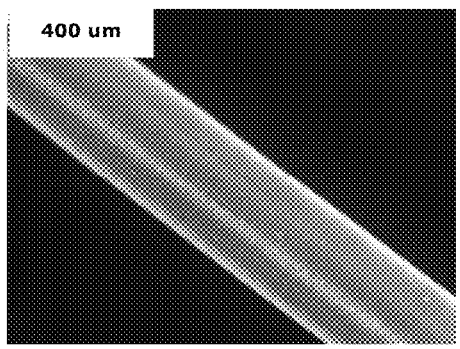
FIG. 4 is an optical micrograph of a section of extrudate strand prepared from the Comparative Example 7 composition.
Figure 5:
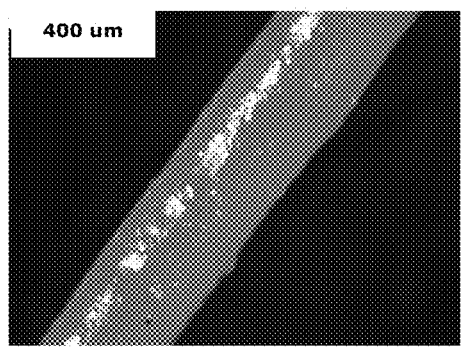
FIG. 5 is an optical micrograph of a section of extrudate strand prepared from the Comparative Example 8 composition.
Figure 6:
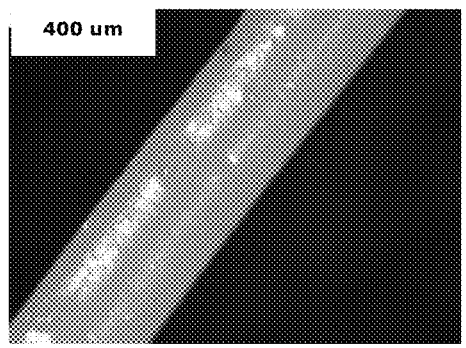
FIG. 6 is an optical micrograph of a section of extrudate strand prepared from the Comparative Example 10 composition.
Figure 7:
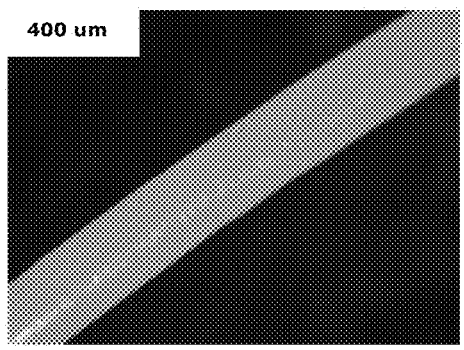
FIG. 7 is an optical micrograph of a section of extrudate strand prepared from the Example 1 composition.
Figure 8:
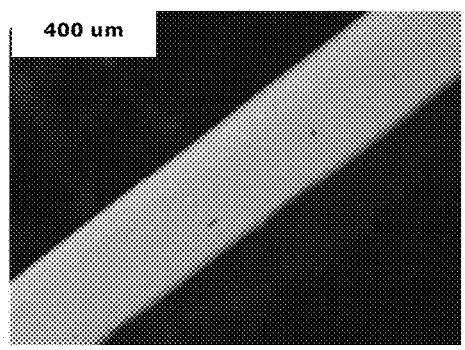
FIG. 8 is an optical micrograph of a section of extrudate strand prepared from the Comparative Example 13 composition.
Figure 9:
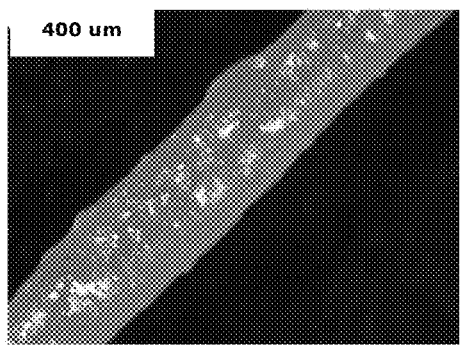
FIG. 9 is an optical micrograph of a section of extrudate strand prepared from the Comparative Example 14 composition.
Figure 10:
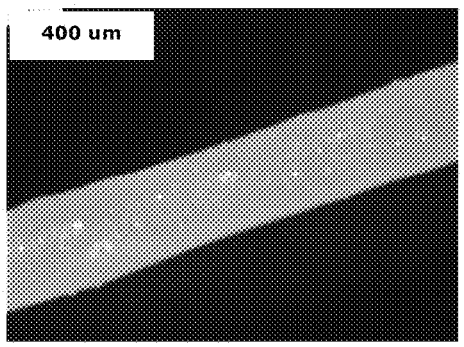
FIG. 10 is an optical micrograph of a section of extrudate strand prepared from the Comparative Example 16 composition.
Figure 11:
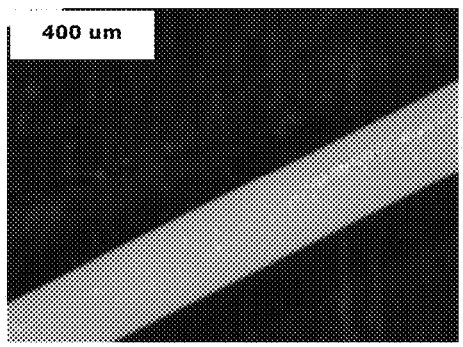
FIG. 11 is an optical micrograph of a section of extrudate strand prepared from the Example 2 composition.
Figure 12:
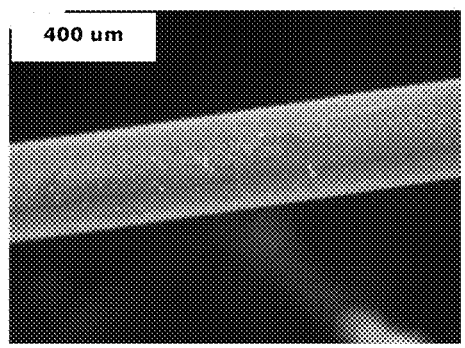
FIG. 12 is an optical micrograph of a section of extrudate strand prepared from the Comparative Example 19 composition.

The present inventors have discovered that polyamide-polyphenylene ether fibers having superior fiber morphology and physical properties can be produced using certain specific proportions of polyamide, polyphenylene ether and compatibilizer by melt blending the compatibilized polyamide-polyphenylene ether blend according to the invention the polyamide forms the produce a continuous phase and the polyphenylene ether is in the form of discontinuous domains dispersed within the polyamide continuous phase. In the resulting compatibilized polyamide-polyphenylene ether blend, the mean cross-sectional area of the disperse phase particles is less than about 0.7 micrometer$^2$, and no more than 0.5 percent of the total disperse phase particles have a cross-sectional area of greater than 5.5 micrometer$^2$, based on the number of disperse phase particles, when measured by scanning transmission electron microscopy [for example, by employing a scanning electron microscope in scanning electron transmission microscopy mode, also referred to as "STEM-in-SEM"]. Note that the stated cross-sectional areas are the dimensions as measured in the described composition after cooling and preparation of samples for observation via microscopy. Note also, that the described dimensions are of the compatibilized polyamide-polyphenylene ether blend itself, in the absence of added solvent which might alter the particle dimensions, such as toluene which is a polyphenylene ether swelling solvent.

The present invention thus provides polyamide-polyphenylene ether fibers having a surprising combination of surface smoothness and physical strength without the complexities described in the prior art discussed above. The compatibilized polyamide-polyphenylene ether blend is therefore essentially free of: a) functionalized olefinic elastomer; b) a polyamide prepared from: 1) a diamine selected from the group consisting of 2,2,4-trimethylhexamethylenedi-amine, hexamethylenediamine, and mixtures thereof, and 2) a diacid selected from the group consisting of isophthalic acid, terephthalic acid, and mixtures thereof; and c) a block copolymer of an alkenyl aromatic compound and a conjugated diene.

In the compatibilized polyamide-polyphenylene ether blend according to the invention the polyamide forms the continuous phase and the polyphenylene ether is in the form of discontinuous domains dispersed within the polyamide continuous phase. The separated domains of polyphenylene ether are referred to as the dispersed phase.

"Essentially free of" generally means that the compatibilized polyamide-polyphenylene ether blend is intended not to contain the named ingredient in an amount that would have any appreciable effect on the nature or properties of the blend, generally less than 0.01 weight percent, typically less than 0.005 weight percent and preferably less than 0.001 weight percent of the named ingredient based on the combined weight of the polyamide and polyphenylene ether polymers.

The components melt blended to form the compatibilized polyamide-polyphenylene ether blend include a polyamide. Polyamides, also known as nylons, are characterized by the presence of a plurality of amide (—C(O)NH—) groups, and are described in U.S. Pat. No. 4,970,272 to Gallucci. Suitable polyamide resins include polyamide-6, polyamide-6,6, polyamide-4, polyamide-4,6, polyamide-12, polyamide-6,10, polyamide 6,9, polyamide-6,12, amorphous polyamide resins, polyamide-6/6T and polyamide-6,6/6T with triamine contents below 0.5 weight percent, polyamide-9T, and combinations thereof. In some embodiments, the polyamide resin comprises polyamide-6, polyamide-9T, or a mixture thereof. In some embodiments, the polyamide resin comprises polyamide-6,6. In some embodiments, the polyamide resin or combination of polyamide resins has a melting point ($T_m$) greater than or equal to 171° C. In some embodiments, the polyamide excludes so-called super tough polyamide, that is, a rubber-toughened polyamide.

Polyamides may be obtained by a number of well known processes such as those described in U.S. Pat. Nos. 2,071,250, 2,071,251, 2,130,523, and 2,130,948 to Carothers; U.S. Pat. Nos. 2,241,322 and 2,312,966 to Hanford; and U.S. Pat. No. 2,512,606 to Bolton et al. Polyamide resins are commercially available from a variety of sources.

Polyamides having an intrinsic viscosity of up to 400 milliliters per gram (mL/g) can be used, or, more specifically, having a viscosity of 90 to 350 mL/g, or, even more specifically, having a viscosity of 110 to 240 mL/g, as measured in a 0.5 weight percent solution in 96 weight percent sulfuric acid in accordance with ISO 307. In some embodiments, the polyamide has a relative viscosity of up to 6, or, more specifically, a relative viscosity of 1.89 to 5.43, or, even more specifically, a relative viscosity of 2.16 to 3.93. Relative viscosity is determined according to DIN 53727 in a 1 weight percent solution in 96 weight percent sulfuric acid.

In some embodiments, the polyamide resin comprises a polyamide having an amine end group concentration less than 100 microequivalents amine end group per gram of polyamide (µeq/g) as determined by titration with hydrochloric acid. The amine end group concentration may be 20 to 100 µeq/g, specifically 30 to 80 µeq/g, more specifically 40 to 70 µeq/g. Amine end group content may be determined by dissolving the polyamide in a suitable solvent, optionally with heat. The polyamide solution is titrated with 0.01 Normal hydrochloric acid (HCl) solution using a suitable indication method. The amount of amine end groups is calculated based the volume of HCl solution added to the sample, the volume of HCl used for the blank, the molarity of the HCl solution, and the weight of the polyamide sample.

The components melt blended to form the compatibilized polyamide-polyphenylene ether blend further include a polyphenylene ether. Suitable polyphenylene ethers include those comprising repeating structural units having the formula

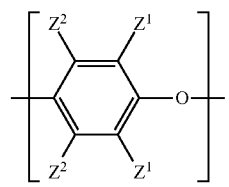

wherein each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms.

As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue. Thus, when specifically described as substituted, the hydrocarbyl residue can also contain one or more carbonyl groups, amino groups, hydroxyl groups, or the like, or it can contain heteroatoms within the backbone of the hydrocarbyl residue. As one example, $Z^1$ can be a di-n-butylaminomethyl group formed by reaction of a terminal 3,5-dimethyl-1,4-phenyl group with the di-n-butylamine component of an oxidative polymerization catalyst.

In some embodiments, the polyphenylene ether has an intrinsic viscosity of about 0.25 to about 1 deciliter per gram measured at 25° C. in chloroform. Within this range, the polyphenylene ether intrinsic viscosity can be about 0.3 to about 0.65 deciliter per gram, more specifically about 0.35 to about 0.5 deciliter per gram, even more specifically about 0.4 to about 0.5 deciliter per gram.

In some embodiments, the polyphenylene ether is a poly(2,6-dimethyl-1,4-phenylene ether) prepared with a morpholine-containing catalyst, wherein a purified sample of poly(2,6-dimethyl-1,4-phenylene ether) prepared by dissolution of the poly(2,6-dimethyl-1,4-phenylene ether) in toluene, precipitation from methanol, reslurry, and isolation has a monomodal molecular weight distribution in the molecular weight range of 250 to 1,000,000 atomic mass units, and comprises less than or equal to 2.2 weight percent of poly(2,6-dimethyl-1,4-phenylene ether) having a molecular weight more than fifteen times the number average molecular weight of the entire purified sample. In some embodiments, the purified sample after separation into six equal poly(2,6-dimethyl-1,4-phenylene ether) weight fractions of decreasing molecular weight comprises a first, highest molecular weight fraction comprising at least 10 mole percent of poly(2,6-dimethyl-1,4-phenylene ether) comprising a terminal morpholine-substituted phenoxy group. The poly(2,6-dimethyl-1,4-phenylene ether) according to these embodiments is further described in U.S. Patent Application Publication No. US 2011/0003962 A1 of Carrillo et al.

The polyphenylene ether can be prepared by the oxidative coupling of the corresponding monohydroxyaromatic compound(s) such as 2,6-xylenol and/or 2,3,6-trimethylphenol. Catalyst systems are generally employed for such coupling. They can contain heavy metal compound(s) such as a copper, manganese, or cobalt compounds, usually in combination with various other materials such as a secondary amine, tertiary amine, halide or combination of two or more of the foregoing.

In some embodiments, the polyphenylene ether has an intrinsic viscosity of about 0.2 to 0.38 deciliter per gram, as measured by Ubbelohde viscometer at 25° C. in chloroform. The intrinsic viscosity can be about 0.24 to about 0.35 deciliter per gram, specifically about 0.27 to about 0.33 deciliter per gram, yet more specifically about 0.28 to about 0.32 deciliter per gram, even more specifically about 0.3 deciliter per gram. Unless otherwise stated, all polyphenylene ether intrinsic viscosity values relate to the polyphenylene ether before it is compounded with other components. The intrinsic viscosity of the polyphenylene ether used in making the polyamide-polyphenylene ether blend (initial intrinsic viscosity) can differ from the intrinsic viscosity of the polyphenylene ether in the polyamide-polyphenylene ether blend (final intrinsic viscosity). Initial intrinsic viscosity is defined as the intrinsic viscosity of the polyphenylene ether prior to melt mixing with the other components of the composition and final intrinsic viscosity is defined as the intrinsic viscosity of the polyphenylene ether after melt mixing with the other components of the composition. As understood by one of ordinary skill in the art the viscosity of the polyphenylene ether may be up to 30% higher after melt mixing.

The components melt blended to form the compatibilized polyamide-polyphenylene ether blend further include a compatibilizing agent. The compatibilizing agent is used to facilitate formation of a compatibilized blend of the polyamide and the polyphenylene ether. As used herein, the term "compatibilizing agent" refers to a polyfunctional compound that interacts with the polyphenylene ether, the polyamide, or both. This interaction can be chemical (for example, grafting) and/or physical (for example, affecting the surface characteristics of the dispersed phases). In either instance the resulting polyamide-polyphenylene ether blend exhibits improved compatibility, particularly as evidenced by enhanced impact strength, mold knit line strength, and/or tensile elongation. As used herein, the expression "compatibilized blend" refers to compositions that have been physically and/or chemically compatibilized with a compatibilizing agent, as well as blends of polyphenylene ethers and polyamides that are compatibilized without the use of a compatibilizing agent, as is the case, for example, when compatibilization is derived from compatibility-enhancing dibutylaminomethyl substituents on the polyphenylene ether.

Examples of compatibilizing agents that can be employed include liquid diene polymers, epoxy compounds, oxidized polyolefin wax, quinones, organosilane compounds, polyfunctional compounds, functionalized polyphenylene ethers, and combinations thereof. Compatibilizing agents are further described in U.S. Pat. No. 5,132,365 to Gallucci, and U.S. Pat. Nos. 6,593,411 and 7,226,963 to Koevoets et al.

In some embodiments, the compatibilizing agent comprises a polyfunctional compound. Polyfunctional compounds that can be employed as a compatibilizing agent are typically of three types. The first type of polyfunctional compound has in the molecule both (a) a carbon-carbon double bond or a carbon-carbon triple bond and (b) at least one carboxylic acid, anhydride, amide, ester, imide, amino, epoxy, orthoester, or hydroxy group. Examples of such polyfunctional compounds include maleic acid; maleic anhydride; fumaric acid; glycidyl acrylate, itaconic acid; aconitic acid; maleimide; maleic hydrazide; reaction products resulting from a diamine and maleic anhydride, maleic acid, fumaric acid, etc.; dichloro maleic anhydride; maleic acid amide; unsaturated dicarboxylic acids (for example, acrylic acid, butenoic acid, methacrylic acid, ethylacrylic acid, pentenoic acid, decenoic acids, undecenoic acids, dodecenoic acids, linoleic acid, etc.); esters, acid amides or anhydrides of the foregoing unsaturated carboxylic acids; unsaturated alcohols (for example, alkanols, crotyl alcohol, methyl vinyl carbinol, 4-pentene-1-ol, 1,4-hexadiene-3-ol, 3-butene-1,4-diol, 2,5-dimethyl-3-hexene-2,5-diol, and alcohols of the formula $C_nH_{2n-5}OH$, $C_nH_{2n-7}OH$ and $C_nH_{2n-9}OH$, wherein n is a positive integer less than or equal to 30); unsaturated amines resulting from replacing from replacing the —OH group(s) of the above unsaturated alcohols with —NH$_2$ group(s); and combinations comprising one or more of the foregoing. In one embodiment, the compatibilizing agent comprises maleic anhydride and/or fumaric acid.

The second type of polyfunctional compatibilizing agent has both (a) a group represented by the formula (OR) wherein R is hydrogen or an alkyl, aryl, acyl or carbonyl dioxy group and (b) at least two groups each of which can be the same or different selected from carboxylic acid, acid halide, anhydride, acid halide anhydride, ester, orthoester, amide, imido, amino, and various salts thereof. Typical of this group of compatibilizing agents are the aliphatic polycarboxylic acids, acid esters, and acid amides represented by the formula:

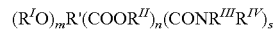

wherein R' is a linear or branched chain, saturated aliphatic hydrocarbon having 2 to 20, or, more specifically, 2 to 10, carbon atoms; $R^I$ is hydrogen or an alkyl, aryl, acyl, or carbonyl dioxy group having 1 to 10, or, more specifically, 1 to 6, or, even more specifically, 1 to 4 carbon atoms; each $R^{II}$ is independently hydrogen or an alkyl or aryl group having 1 to 20, or, more specifically, 1 to 10 carbon atoms; each $R^{III}$ and $R^{IV}$ are independently hydrogen or an alkyl or aryl group having 1 to 10, or, more specifically, 1 to 6, or, even more specifically, 1 to 4, carbon atoms; m is equal to 1 and (n+s) is greater than or equal to 2, or, more specifically, equal to 2 or 3, and n and s are each greater than or equal to zero and wherein ($OR^I$) is alpha or beta to a carbonyl group and at least two carbonyl groups are separated by 2 to 6 carbon atoms. Obviously, $R^I$, $R^{II}$, $R^{III}$, and $R^{IV}$ cannot be aryl when the respective substituent has less than 6 carbon atoms.

Suitable polycarboxylic acids include, for example, citric acid, malic acid, and agaricic acid, including the various commercial forms thereof, such as for example, the anhydrous and hydrated acids; and combinations comprising one or more of the foregoing. In one embodiment, the compatibilizing agent comprises citric acid. Illustrative of esters useful herein include, for example, acetyl citrate, monostearyl and/or distearyl citrates, and the like. Suitable amides useful herein include, for example, N,N'-diethyl citric acid amide; N-phenyl citric acid amide; N-dodecyl citric acid amide; N,N'-didodecyl citric acid amide; and N-dodecyl malic acid. Derivatives include the salts thereof, including the salts with amines and the alkali and alkaline metal salts. Examples of suitable salts include calcium malate, calcium citrate, potassium malate, and potassium citrate.

The third type of polyfunctional compatibilizing agent has in the molecule both (a) an acid halide group and (b) at least one carboxylic acid, anhydride, ester, epoxy, orthoester, or amide group, preferably a carboxylic acid or anhydride group. Examples of compatibilizing agents within this group include trimellitic anhydride acid chloride, chloroformyl succinic anhydride, chloroformyl succinic acid, chloroformyl glutaric anhydride, chloroformyl glutaric acid, chloroacetyl succinic anhydride, chloroacetylsuccinic acid, trimellitic acid chloride, and chloroacetyl glutaric acid. In one embodiment, the compatibilizing agent comprises trimellitic anhydride acid chloride.

The foregoing compatibilizing agents can be added directly to the melt blend or pre-reacted with either or both of the polyphenylene ether and the polyamide, as well as with any other resinous materials employed in the preparation of the compatibilized polyamide-polyphenylene ether blend. With many of the foregoing compatibilizing agents, particularly the polyfunctional compounds, even greater improvement in compatibility is found when at least a portion of the compatibilizing agent is pre-reacted, either in the melt or in a solution of a suitable solvent, with all or a part of the polyphenylene ether. It is believed that such pre-reacting may cause the compatibilizing agent to react with and consequently functionalize the polyphenylene ether. For example, the polyphenylene ether can be pre-reacted with maleic anhydride to form an anhydride-functionalized polyphenylene ether that has improved compatibility with the polyamide compared to a non-functionalized polyphenylene ether.

In some embodiments, the compatibilizing agent is selected from fumaric acid, maleic acid, maleic anhydride, citric acid, and combinations thereof. Fumaric acid is a presently preferred compatibilizer due to its superior effectiveness and low toxicity. Maleic anhydride and maleic acid are also effective at comparable concentrations, however in order to employ them in production processes additional appropriate safety procedures may be required. Citric acid is also useful as a compatibilizer, however concentrations at the higher end of disclosed ranges may be required in order to produce comparable results when preparing citric acid compatibilized blends. The foregoing compatibilizing agents may be added directly to the melt blend or pre-reacted with either or both of the polyphenylene ether and the polyamide.

The amount of compatibilizing agent used will be dependent upon the specific compatibilizing agent chosen and the specific polymeric system to which it is added. In some embodiments the compatabilizer can be present in an amount of about 0.35 to about 1.2 weight percent, specifically about 0.4 to about 1.1 weight percent, more specifically from about 0.5 to about 1.0 weight percent, and even more specifically from about 0.6 to about 0.9 weight percent, based on the total weight of the polyamide-polyphenylene ether polymers.

The compatibilized polyamide-polyphenylene ether blend produces fibers of low denier per fiber and high tenacity when no more than 0.5 percent of the total disperse phase particles have a cross-sectional area of greater than 5.5 micrometer$^2$, based on the number of disperse phase particles. In other embodiments no more than 0.5 percent of the total disperse phase particles have a cross-sectional area of greater than 4.5 micrometer$^2$. More specifically, no more than 0.5 percent of the total disperse phase particles have a cross-sectional area of greater than 3.5 micrometer$^2$.

In some embodiments, the fiber has a diameter of about 10 micrometers to about 5 millimeters. Within this range, the diameter can be about 15 micrometers to about 1 millimeter, specifically about 20 to about 500 micrometers, more specifically about 20 to about 200 micrometers, even more specifically about 20 to about 100 micrometers. As the composition is typically suitable for the continuous production of fiber, there is no particular upper limit on the fiber length. However, the fiber length is typically at least 1 centimeter long, specifically at least one meter long.

The fibers may be solid or hollow and may have various shapes in cross-section, such as for example round, oval, flat, triangular, tetragonal, polygonal, bilobal, multilobal, etc., as is well known in the fiber-spinning art. The fibers may be provided in various known configurations such as continuous filaments, chopped, carded, loose, spun into yarn, or formed into woven or non-woven textiles according to techniques well-known in the art.

In some embodiments, the melt blended components comprise the polyphenylene ether in an amount of from about 5 to about 60 weight percent and a polyamide in an amount of from about 40 to about 95 weight percent, wherein all weight percents are based on the total weight of the polyamide-polyphenylene ether polymers. Within this range, the amounts of polyphenylene ether can be from about 10 to 50 weight percent and the amounts of polyamide can be from about 50 to about 90 weight percent. Specifically, the amounts of polyphenylene ether can be from about 20 to 40 weight percent and the amounts of polyamide can be from about 60 to about 80 weight percent about weight percent. In other embodiments, the amount of polyphenylene ether is from about 50 to about 60 weight percent, specifically about 55 to about 60 weight percent.

The invention includes methods of making the fiber. The methods can utilize known procedures and apparatuses for preparing fibers from polymer compositions. A specific fiber-forming method is described in the working examples.

In some embodiments, the compatibilized polyamide-polyphenylene ether blend is substantially free of glass fibers. In some embodiments, the compatibilized polyamide-polyphenylene ether blend is substantially free of electrically conductive fillers. In some embodiments, the compatibilized polyamide-polyphenylene ether blend is substantially free of impact modifiers. In some embodiments, the compatibilized polyamide-polyphenylene ether blend is substantially free of any polymer other than the polyamide and the polyphenylene ether. In some embodiments, the compatibilized polyamide-polyphenylene ether blend is substantially free of flame retardants. "Substantially free of" generally means that the compatibilized polyamide-polyphenylene ether blend contains less than 0.05 weight percent, typically less than 0.01 weight percent and preferably less that 0.005 weight percent of the named component based on the combined weight of the polyamide and polyphenylene ether polymers.

Core/Sheath fiber. In some embodiments, the fiber comprising the compatibilized blend of polyamide and poly(aryl ether) polymer can be melt spun along with a second polyamide to form a core/sheath fiber according to known methods. Methods for making bi component and multicomponent fibers are well known and need not be described here in detail. For example, U.S. Pat. No. 5,227,109, which is hereby incorporated by reference, describes forming bicomponent fibers in a sheath-core relationship in a spinning pack that incorporates a plurality of adjacent plates that define predetermined flow paths therein for a sheath component and a core component to direct the respective components into the sheath-core relationship. In addition, more complex multicomponent fiber morphologies may be considered within the term core sheath as used herein, such as disclosed in U.S. Pat. No. 5,458,972, which is hereby incorporated by reference, and describes a method of producing a multicomponent trilobal fiber using a trilobal capillary defining three legs, three apexes and an axial center, by directing a first molten polymer composition to the axial center and presenting a second molten polymer composition to at least one of the apexes. The fiber produced has a trilobal core defining an outer core surface and a sheath abutting at least about one-third of the outer core surface.

In various embodiments, the compatibilized blend can be the core fiber while the second polyamide is the sheath fiber, or the second polyamide can be the core fiber while the compatibilized blend is the sheath fiber. The second polyamide can be selected from the polyamides described above in the context of the compatibilized polyamide-polyphenylene ether blend. In a given core/sheath fiber, the second polyamide can be the same as or different from the (first) polyamide used in the core comprising the compatibilized polyamide-polyphenylene ether blend.

In some embodiments, the melt extruding is conducted at a temperature of about 250 to about 300° C. Within this range, the extrusion temperature can be about 260 to about 290° C.

The invention includes at least the following embodiments.

Embodiment 1

A fiber comprising a compatibilized polyamide-polyphenylene ether blend, wherein the compatibilized polyamide-polyphenylene ether blend is the product of melt blending components comprising about 40 to about 95 weight percent of a polyamide having an amine end group concentration of less than or equal to 100 microequivalents per gram, about 5 to about 60 weight percent of a polyphenylene ether having an intrinsic viscosity of from about 0.2 to 0.38 deciliter per gram, measured at 25° C. in chloroform, and about 0.35 to about 1.2 weight percent of a compatibilizing agent; wherein all weight percents are based on the total weight of the polyamide-polyphenylene ether polymers; wherein the compatibilized polyamide-polyphenylene ether blend comprises a continuous phase comprising the polyamide, and a disperse phase comprising the polyphenylene ether; wherein the mean cross-sectional area of the disperse phase particles is less than or equal to about 0.7 micrometer$^2$, and no more than 0.5 percent of the total disperse phase particles have a cross-sectional area of greater than 5.5 micrometer$^2$, based on the number of disperse phase particles, when measured by scanning transmission electron microscopy ["STEM"]; and wherein the compatibilized polyamide-polyphenylene ether blend is essentially free of: a) functionalized olefinic elastomer; b) a polyamide prepared from: 1) a diamine selected from the group consisting of 2,2,4-trimethylhexamethylenediamine, hexamethylenediamine, and mixtures thereof, and 2) a diacid selected from the group consisting of isophthalic acid, terephthalic acid, and mixtures thereof; and c) a block copolymer of an alkenyl aromatic compound and a conjugated diene.

Embodiment 2

The fiber of embodiment 1, wherein the polyamide is selected from the group consisting of polyamide-6, polyamide-6,6, and mixtures thereof.

Embodiment 3

The fiber of embodiment 1, wherein the polyamide comprises polyamide-6,6.

Embodiment 4

The fiber of embodiment 1, wherein the polyamide has an amine end group concentration of 20 to 100 microequivalents per gram.

Embodiment 5

The fiber of embodiment 1, wherein the polyamide has an amine end group concentration of 30 to 80 microequivalents per gram.

Embodiment 6

The fiber of embodiment 1, wherein the polyamide has an amine end group concentration of 40 to 70 microequivalents per gram.

Embodiment 7

The fiber of embodiment 1, wherein the melt blended components comprise the polyamide in an amount of about 50 to about 90 weight percent and the polyphenylene ether in an amount of about 10 to about 50 weight percent.

Embodiment 8

The fiber of embodiment 1, wherein the melt blended components comprise the polyamide in an amount of about 60 to about 80 weight percent and the polyphenylene ether in an amount of about 20 to about 40 weight percent.

Embodiment 9

The fiber of embodiment 1, wherein the melt blended components comprise the polyphenylene ether in an amount of about 55 to about 60 weight percent.

Embodiment 10

The fiber of embodiment 1, wherein the polyphenylene ether comprises poly(2,6-dimethyl-1,4-phenylene ether) having an intrinsic viscosity of from about 0.24 to about 0.35 deciliter per gram, measured at 25° C. in chloroform.

Embodiment 11

The fiber of embodiment 1, wherein the polyphenylene ether has an intrinsic viscosity of from about 0.27 to about 0.33 deciliter per gram.

Embodiment 12

The fiber of embodiment 1, wherein the melt blended components comprise the compatibilizing agent in an amount of about 0.4 to about 1.1 weight percent.

Embodiment 13

The fiber of embodiment 1, wherein the melt blended components comprise the compatibilizing agent in an amount of about 0.5 to about 1.0 weight percent.

Embodiment 14

The fiber of embodiment 1, wherein the melt blended components comprise the compatibilizing agent in an amount of about 0.6 to about 0.9 weight percent.

Embodiment 15

The fiber of embodiment 1, wherein the compatibilizing agent comprises fumaric acid.

Embodiment 16

The fiber of embodiment 1, wherein the compatibilized polyamide-polyphenylene ether blend is substantially free of any polymer other than the polyamide and the polyphenylene ether.

Embodiment 17

The fiber of embodiment 1, wherein no more than 0.5 percent of the total disperse phase particles have a cross-sectional area of greater than 4.5 micrometer$^2$.

Embodiment 18

The fiber of embodiment 1, wherein no more than 0.5 percent of the total disperse phase particles have a cross-sectional area of greater than 3.5 micrometer$^2$.

Embodiment 19

A fiber comprising a compatibilized polyamide-polyphenylene ether blend, wherein the compatibilized polyamide-polyphenylene ether blend is the product of melt blending components comprising: about 50 to about 89.5 weight percent of a polyamide having an amine end group concentration of less than or equal to 100 microequivalents per gram, about 10 to about 49.5 weight percent of a polyphenylene ether, and about 0.35 to about 1.0 weight percent of a compatibilizing agent comprising fumaric acid; wherein all weight percents are based on the total weight of the polyamide-polyphenylene ether polymers; wherein the polyamide is selected from the group consisting of polyamide-6, polyamide-6,6, and mixtures thereof; wherein the polyphenylene ether has an intrinsic viscosity of about 0.24 to about 0.35 deciliter per gram, measured at 25° C. in chloroform; wherein the compatibilized polyamide-polyphenylene ether blend comprises a continuous phase comprising the polyamide, and a disperse phase comprising the polyphenylene ether; wherein the mean cross-sectional area of the disperse phase particles is less than or equal to about 0.7 micrometer$^2$, and no more than 0.5 percent of the total disperse phase particles have a cross-sectional area of greater than 5.5 micrometer$^2$, based on the number of disperse phase particles, when measured by scanning transmission electron microscopy; and wherein the compatibilized polyamide-polyphenylene ether blend is essentially free of a) functionalized olefinic elastomer and b) a polyamide prepared from: 1) a diamine selected from the group consisting of 2,2,4-trimethylhexamethylenediamine, hexamethylenediamine, and mixtures thereof; and 2) a diacid selected from the group consisting of isophthalic acid, terephthalic acid, and mixtures thereof and c) a block copolymer of an alkenyl aromatic compound and a conjugated diene.

Embodiment 20

A core/sheath fiber comprising: a core comprising the fiber of embodiment 1; and a sheath substantially surrounding the core, wherein the sheath comprises a second polyamide and is substantially free of polyphenylene ether.

Embodiment 21

A core/sheath fiber comprising: a core comprising the fiber of embodiment 19; and a sheath substantially surrounding the core, wherein the sheath comprises a second polyamide and is substantially free of polyphenylene ether.

Embodiment 22

A core/sheath fiber comprising: a core comprising a polyamide and being substantially free of polyphenylene ether; and a sheath substantially surrounding the core and comprising a compatibilized polyamide-polyphenylene ether blend; wherein the compatibilized polyamide-polyphenylene ether blend is the product of melt blending components comprising about 40 to about 95 weight percent of a polyamide having an amine end group concentration of less than or equal to 100 microequivalents per gram, about 5 to about 60 weight percent of a polyphenylene ether having an intrinsic viscosity of about 0.2 to 0.38 deciliter per gram, measured at 25° C. in chloroform, and about 0.35 to about 1.2 weight percent of a compatibilizing agent, wherein all weight percents are based on the total weight of the polyamide-polyphenylene ether polymers; wherein the compatibilized polyamide-polyphenylene ether blend comprises a continuous phase comprising the polyamide, and a disperse phase comprising the polyphenylene ether; wherein the mean cross-sectional area of the disperse phase particles is less than or equal to about 0.7 micrometer$^2$, and no more than 0.5 percent of the total disperse phase particles have a cross-sectional area of greater than 5.5 micrometer$^2$, based on the number of disperse phase particles, when measured by scanning transmission electron microscopy; and wherein the compatibilized polyamide-polyphenylene ether blend is essentially free of a) functionalized olefinic elastomer, and b) a polyamide prepared from 1) a diamine selected from the group consisting of 2,2,4-trimethylhexamethylenediamine, hexamethylenediamine, and mixtures thereof, and 2) a diacid selected from the group consisting of isophthalic acid, terephthalic acid, and mixtures thereof; and c) a block copolymer of an alkenyl aromatic compound and a conjugated diene.

Embodiment 23

A core/sheath fiber comprising: a core comprising a polyamide and being substantially free of polyphenylene ether; and a sheath substantially surrounding the core and comprising a compatibilized polyamide-polyphenylene ether blend; wherein the compatibilized polyamide-polyphenylene ether blend is the product of melt blending components comprising about 50 to about 89.5 weight percent of a polyamide, about 10 to about 49.5 weight percent of a polyphenylene ether having an intrinsic viscosity of about 0.24 to about 0.35 deciliter per gram, measured at 25° C. in chloroform, and about 0.35 to about 1 weight percent of a compatibilizing agent; wherein all weight percents are based on the total weight of the polyamide-polyphenylene ether polymers; wherein the polyamide is selected from the group consisting of polyamide-6, polyamide-6,6, and mixtures thereof; wherein the polyamide has an amine end group concentration of less than or equal to 100 microequivalents per gram; wherein the compatibilized polyamide-polyphenylene ether blend comprises a continuous phase comprising the polyamide, and a disperse phase comprising the polyphenylene ether; wherein the mean cross-sectional area of the disperse phase particles is less than or equal to about 0.7 micrometer$^2$, and no more than 0.5 percent of the total disperse phase particles have a cross-sectional area of greater than 5.5 micrometer$^2$, based on the number of disperse phase particles, when measured by scanning transmission electron microscopy; and wherein the compatibilized polyamide-polyphenylene ether blend is essentially free of: a) functionalized olefinic elastomer, and b) a polyamide prepared from: 1) a diamine selected from the group consisting of 2,2,4-trimethylhexamethylenediamine, hexamethylenediamine, and mixtures thereof; and 2) a diacid selected from the group consisting of isophthalic acid, terephthalic acid, and mixtures thereof; and c) a block copolymer of an alkenyl aromatic compound and a conjugated diene.

Embodiment 24

A method of melt spinning a fiber, comprising: melt extruding a compatibilized polyamide-polyphenylene ether blend to form a fiber; wherein the compatibilized polyamide-polyphenylene ether blend is the product of melt blending components comprising about 40 to about 95 weight percent of a polyamide having an amine end group concentration of less than or equal to 100 microequivalents per gram, about 5 to about 60 weight percent of a polyphenylene ether having an intrinsic viscosity of about 0.2 to about 0.38 deciliter per gram, measured at 25° C. in chloroform, and about 0.35 to about 1.2 weight percent of a compatibilizing agent; wherein all weight percents are based on the total weight of the polyamide-polyphenylene ether polymers; wherein the compatibilized polyamide-polyphenylene ether blend comprises a continuous phase comprising the polyamide, and a disperse phase comprising the polyphenylene ether; wherein the mean cross-sectional area of the disperse phase particles is less than or equal to about 0.7 micrometer$^2$, and no more than 0.5 percent of the total disperse phase particles have a cross-sectional area of greater than 5.5 micrometer$^2$, based on the number of disperse phase particles, when measured by scanning transmission electron microscopy; and wherein the compatibilized polyamide-polyphenylene ether blend is essentially free of: a) functionalized olefinic elastomer, and b) a polyamide prepared from: 1) a diamine selected from the group consisting of 2,2,4-trimethylhexamethylenediamine, hexamethylenediamine, and mixtures thereof, and 2) a diacid selected from the group consisting of isophthalic acid, terephthalic acid, and mixtures thereof; and c) a block copolymer of an alkenyl aromatic compound and a conjugated diene.

Embodiment 25

The method of embodiment 24, wherein the polyamide is selected from the group consisting of polyamide-6, polyamide-6,6, and mixtures thereof.

Embodiment 26

The method of embodiment 24, wherein the polyamide comprises polyamide-6,6.

Embodiment 27

The method of embodiment 24, wherein the polyamide has an amine end group concentration of 20 to 100 microequivalents per gram.

Embodiment 28

The method of embodiment 24, wherein the polyamide has an amine end group concentration of 30 to 80 microequivalents per gram.

Embodiment 29

The method of embodiment 24, wherein the polyamide has an amine end group concentration of 40 to 70 microequivalents per gram.

Embodiment 30

The method of embodiment 24, wherein the melt blended components comprise the polyamide in an amount from about 50 to about 90 weight percent and the polyphenylene ether in an amount of about 10 to about 50 weight percent.

Embodiment 31

The method of embodiment 24, wherein the melt blended components comprise the polyamide in an amount from about 60 to about 80 weight percent and the polyphenylene ether in an amount of about 20 to about 40 weight percent.

Embodiment 32

The method of embodiment 24, wherein the melt blended components comprise the polyphenylene ether in an amount of about 55 to about 60 weight percent.

Embodiment 33

The method of embodiment 24, wherein the polyphenylene ether comprises poly(2,6-dimethyl-1,4-phenylene ether) having an intrinsic viscosity of from about 0.24 to about 0.35 deciliter per gram.

Embodiment 34

The method of embodiment 24, wherein the polyphenylene ether has an intrinsic viscosity of from about 0.27 to about 0.33 deciliter per gram.

Embodiment 35

The method of embodiment 24, wherein the melt blended components comprise the compatibilizing agent in an amount from about 0.4 to about 1.1 weight percent.

Embodiment 36

The method of embodiment 24, wherein the melt blended components comprise the compatibilizing agent in an amount from about 0.5 to about 1.0 weight percent.

Embodiment 37

The method of embodiment 24, wherein the melt blended components comprise the compatibilizing agent in an amount from about 0.6 to about 0.9 weight percent.

Embodiment 38

The method of embodiment 24, wherein the compatibilizing agent comprises fumaric acid.

Embodiment 39

The method of embodiment 24, wherein the compatibilized polyamide-polyphenylene ether blend is substantially free of any polymer other than the polyamide and the polyphenylene ether.

Embodiment 40

A method of melt spinning a fiber, comprising: melt extruding a compatibilized polyamide-polyphenylene ether blend to form a fiber; wherein the compatibilized polyamide-polyphenylene ether blend is the product of melt blending components comprising about 50 to about 89.5 weight percent of a polyamide having an amine end group concentration of less than or equal to 100 microequivalents per gram, about 10 to about 49.5 weight percent of a polyphenylene ether, and about 0.35 to about 1 weight percent of a compatibilizing agent selected from the group consisting of citric acid, fumaric acid, maleic acid, and mixtures thereof; wherein all weight percents are based on the total weight of the polyamide-polyphenylene ether polymers; wherein the polyamide is selected from the group consisting of polyamide-6, polyamide-6,6, and mixtures thereof; wherein the polyphenylene ether has an intrinsic viscosity of about 0.24 to about 0.35 deciliter per gram, measured at 25° C. in chloroform; wherein the compatibilized polyamide-polyphenylene ether blend comprises a continuous phase comprising the polyamide, and a disperse phase comprising the polyphenylene ether; wherein the mean cross-sectional area of the disperse phase particles is less than or equal to about 0.7 micrometer$^2$, and no more than 0.5 percent of the total disperse phase particles have a cross-sectional area of greater than 5.5 micrometer$^2$, based on the number of disperse phase particles, when measured by scanning transmission electron microscopy; and wherein compatibilized polyamide-polyphenylene ether blend is essentially free of a) functionalized olefinic elastomer, and b) a polyamide prepared from 1) a diamine selected from the group consisting of 2,2,4-trimethylhexamethylenediamine, hexamethylenediamine, and mixtures thereof; and 2) a diacid selected from the group consisting of isophthalic acid, terephthalic acid, and mixtures thereof; and c) a block copolymer of an alkenyl aromatic compound and a conjugated diene.

Embodiment 41

A textile comprising the fiber of embodiment 1.

The invention is further illustrated by the following non-limiting examples.

Examples 1-4, Comparative Examples 1-16

Components used to form fiber-spinning compositions are summarized in Table 1.

TABLE 1

| Component | Description |
| --- | --- |
| PPE, 0.46 | Poly(2,6-dimethyl-1,4-phenylene ether), CAS Reg. No. 25134-01-4, having an intrinsic viscosity of about 0.46 deciliter per gram measured in chloroform at 25° C., and a weight average molecular weight of about 65,000 atomic mass units; obtained as PPO 646 from SABIC Innovative Plastics. |
| PPE, 0.40 | Poly(2,6-dimethyl-1,4-phenylene ether), CAS Reg. No. 25134-01-4, having an intrinsic viscosity of about 0.40 deciliter per gram measured in chloroform at 25° C., and a weight average molecular weight of about 55,000 atomic mass units; obtained as PPO 640 from SABIC Innovative Plastics. |
| PPE, 0.30 | Poly(2,6-dimethyl-1,4-phenylene ether), CAS Reg. No. 25134-01-4, having an intrinsic viscosity of about 0.30 deciliter per gram measured in chloroform at 25° C., and a weight average molecular weight of about 45,000 atomic mass units; obtained as PPO 630 from SABIC Innovative Plastics. |
| Fumaric acid | Fumaric acid, CAS Reg. No. 110-17-8; obtained from Ashland Chemical. |
| PA-6, high AEG | Polyamide-6 having a relative viscosity of about 120-135 measured in 90% formic acid, and an amine end group concentration of about 110-130 microequivalents per gram; obtained as RD928 from Custom Resins. |
| PA-6, low AEG, high flow | Polyamide-6 having a relative viscosity of about 34-42 measured in 90% formic acid, and an amine end group concentration of about 58-66 microequivalents per gram; obtained as RD963 from Custom Resins. |
| PA-6,6, low AEG, high flow | Polyamide-6,6 having a relative viscosity of about 34-38 measured in 90% formic acid, and an amine end group concentration of about 49-53 microequivalents per gram; obtained as VYDYNE 212LV from Ascend. |

Fiber-spinning compositions utilizing a high amine end group polyamide and exploring the effects of polyphenylene ether intrinsic viscosity and compatibilizing agent loading are summarized in Table 2, where component amounts are expressed in parts by weight. The listed components were melt blended and compounded in a Werner & Pfleiderer 30 millimeter internal diameter twin-screw extruder operated at 300 rotations per minute with a material throughput of about 23 kilograms/hour (50 pounds/hour). A polyphenylene ether dry blend comprising polyphenylene ether and fumaric acid (compatibilizing agent) was fed into the upstream feed port of the extruder, and the polyamide was fed into the downstream port. The extruder temperature was maintained at 204° C. (400° F.) in zone 1 (the most upstream zone), at 299° C. (570° F.) in zones 2-10, and at 304° C. (580° F.) at the die. The extrudate was cooled and pelletized, and pellets were dried at 220° C. (428° F.) and for 3-4 hours prior to use for injection molding or fiber spinning.

Properties are summarized in Table 2. Test articles for physical property testing were injection molded using a Van Dorn 85T injection molding machine operating at a barrel temperature of about 295° C. and a mold temperature of about 90° C. Heat deflection temperature, expressed in degrees centigrade, was measured according to ISO 75-1 and 75-2, using Method B and bar dimensions of 80 millimeters by 10 millimeters by 4 millimeters, a test orientation of flat-wise, a support span of 64 millimeters, a loading fiber stress of 0.45 megapascals, a heating rate of 120° C. per hour, and a deflection limit of 0.34 millimeters. Notched Izod impact strength, expressed in kilojoules per meter, was measured according to ISO 180/U, using a temperature of 23° C., a hammer energy of 2.75 joules, a bar length of 88 millimeters and bar cross-sectional dimensions of 4 millimeters by 10 millimeters. Elastic modulus (expressed in megapascals), tensile stress at yield (expressed in megapascals), tensile stress at break (expressed in megapascals), and tensile strain at break (expressed in percent) were measured according to ISO 527-1 and 527-2, using a temperature of 23° C., a Type 1A bar having dimensions of 80 millimeters by 10 millimeters by 4 millimeters, a gage length (extensometer separation) of 50 millimeters, a grip separation of 115 millimeters, and a test speed of 1 millimeter per minute for tensile modulus and 50 millimeters per minute for tensile stress and tensile strain. Melt mass-flow rate (expressed in grams per 10 minutes) was measured according to ISO 1133, using Procedure B, a temperature of 280° C. and a load of 5 kilograms.

Particle Size Characterization—Disperse phase particle size of the compositions was evaluated by scanning electron microscopy. Extrudate samples were microtomed using a diamond knife at room temperature to expose a smooth surface. The smooth surface was etched in toluene for 15 seconds to swell and extract the polyphenylene ether leaving voids representing the polyphenylene ether phase. Micrographs of extrudate corresponding to Comparative Example 1, Comparative Example 3, Comparative Example 6, and Comparative Example 9 are presented in FIGS. 1-4, respectively.

TABLE 2

| | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|
| COMPOSITIONS | | | | | | | |
| PPE, 0.46 | 40 | 40 | 0 | 0 | 0 | 0 | 0 |
| PPE, 0.40 | 0 | 0 | 40 | 40 | 0 | 0 | 0 |
| PPE, 0.30 | 0 | 0 | 0 | 0 | 40 | 40 | 0 |
| Fumaric acid | 0.3 | 0.8 | 0.3 | 0.8 | 0.3 | 0.8 | 0 |
| PA-6, high AEG | 60 | 60 | 60 | 60 | 60 | 60 | 100 |
| Total | 100.3 | 100.8 | 100.3 | 100.8 | 100.3 | 100.8 | 100 |
| PROPERTIES | | | | | | | |
| Heat defl. temp. (° C.) | 185 | 184 | 181 | 173 | 177 | 174 | 167 |
| Notched Izod (kJ/m$^2$) | 3.7 | 4.3 | 3.6 | 3.8 | 4.0 | 3.6 | 4.8 |
| Elastic modulus (MPa) | 2580 | 2645 | 2698 | 2782 | 2790 | 2873 | 3079 |
| Tensile stress at yield (MPa) | 74 | 74 | 73 | 77 | 77 | 81 | 81 |
| Tensile stress at break (MPa) | 67 | 64 | 70 | 73 | 76 | 53 | 64 |
| Tensile strain at break (%) | 8 | 6 | 5 | 5 | 5 | 33 | 21 |
| Melt flow rate (g/10 min) | 81 | 30 | 76 | 20 | 60 | 21 | — |
| PPE PARTICLE SIZE (μm$^2$) | | | | | | | |
| Mean | 2.20 | — | 1.56 | — | — | 0.71 | — |
| Standard Deviation | 7.40 | — | 6.78 | — | — | 0.91 | — |
| PPE particle size (μm$^2$) cutoff, reported at, x % of particle population | | | | | | | |
| 97.5% are smaller than | 6.42 | — | 4.83 | — | — | 3.14 | — |
| 99.0% are smaller than | 36.76 | — | 15.25 | — | — | 4.49 | — |
| 99.5% are smaller than | 66.06 | — | 31.97 | — | — | 5.73 | — |

The polyamide-polyphenylene ether compositions of Table 2, all prepared with high amino end group polyamide-6, exhibited relatively low tensile strain at break values and relatively high surface roughness.

The examples in Table 3 utilize a high-flow polyamide-6,6 with a low amino end group concentration. These examples further explore the effects of polyphenylene ether intrinsic viscosity and compatibilizing agent loading. Micrographs of extrudate strands corresponding to Comparative Example 8, Comparative Example 10, Example 1, and Comparative Example 13 are presented in FIGS. 5-8, respectively. The polyamide-polyphenylene ether compositions prepared with high-flow, low amino end group polyamide-6,6 generally exhibited higher tensile strain at break values than the corresponding composition prepared with high amino end group (and lower flow) polyamide-6 (compare Tables 2 and 3). The best tensile strain at break performance was exhibited by the composition with low intrinsic viscosity polyphenylene ether and a high compatibilizing agent content (Example 1). Furthermore, extrudate strands prepared from the Table 3 compositions generally displayed acceptable degrees of surface roughness.

nylene ether intrinsic viscosity and compatibilizing agent loading. Micrographs of extrudate strands corresponding to Comparative Example 14, Comparative Example 16, Comparative Example 17, and Comparative Example 19 are presented in FIGS. 9-12, respectively. The tensile strain at break performance of the Table 4 examples, all with high-flow, low amino end group polyamide-6, was intermediate between that of the Table 2 examples with low-flow, high amino end group polyamide-6 (worst) and the Table 3 examples, all with high-flow, low amino end group polyamide-6,6 (best). The

TABLE 3

|  | Comp. Ex. 8 | Comp. Ex. 9 | Comp. Ex. 10 | Comp. Ex. 11 | Comp. Ex. 12 | Ex. 1 | Comp. Ex. 13 |
|---|---|---|---|---|---|---|---|
| COMPOSITIONS | | | | | | | |
| PPE, 0.46 | 40 | 40 | 0 | 0 | 0 | 0 | 0 |
| PPE, 0.40 | 0 | 0 | 40 | 40 | 0 | 0 | 0 |
| PPE, 0.30 | 0 | 0 | 0 | 0 | 40 | 40 | 0 |
| Fumaric acid | 0.3 | 0.8 | 0.3 | 0.8 | 0.3 | 0.8 | 0 |
| PA-6,6, low AEG, high flow | 60 | 60 | 60 | 60 | 60 | 60 | 100 |
| Total | 100.3 | 100.8 | 100.3 | 100.8 | 100.3 | 100.8 | 100 |
| PROPERTIES | | | | | | | |
| Heat defl. temp. (° C.) | 205 | 202 | 199 | 199 | 198 | 198 | 215 |
| Notched Izod (kJ/m$^2$) | 3.7 | 3.7 | 3.7 | 3.5 | 3.8 | 3.4 | 4.3 |
| Elastic modulus (MPa) | 2813 | 2864 | 2859 | 2829 | 2843 | 3127 | 3040 |
| Tensile stress at yield (MPa) | 75 | 76 | 74 | 69 | 78 | 88 | 83 |
| Tensile stress at break (MPa) | 75 | 72 | 57 | 58 | 62 | 73 | 66 |
| Tensile strain at break (%) | 6 | 8 | 21 | 18 | 25 | 22 | 25 |
| Melt flow rate (g/10 min) | 110 | 95 | 108 | 85 | 85 | 68 | — |
| PPE PARTICLE SIZE (μm$^2$) | | | | | | | |
| Mean | 1.34 | — | 0.94 | — | — | 0.64 | — |
| Standard Deviation | 6.29 | — | 2.31 | — | — | 0.72 | — |
| PPE particle size (μm$^2$) cutoff, reported at, x % of particle population | | | | | | | |
| 97.5% are smaller than | 6.42 | — | 4.83 | — | — | 2.31 | — |
| 99.0% are smaller than | 12.74 | — | 7.99 | — | — | 3.23 | — |
| 99.5% are smaller than | 21.81 | — | 10.13 | — | — | 4.71 | — |

The examples in Table 4 utilize a high-flow, low amino end group polyamide-6 and further explore the effects of polypheextrudate strands prepared from the Table 4 compositions generally displayed acceptable degrees of surface roughness.

TABLE 4

|  | Comp. Ex. 14 | Comp. Ex. 15 | Comp. Ex. 16 | Comp. Ex. 17 | Comp. Ex. 18 | Ex. 2 | Comp. Ex. 19 |
|---|---|---|---|---|---|---|---|
| COMPOSITIONS | | | | | | | |
| PPE, 0.46 | 40 | 40 | 0 | 0 | 0 | 0 | 0 |
| PPE, 0.40 | 0 | 0 | 40 | 40 | 0 | 0 | 0 |
| PPE, 0.30 | 0 | 0 | 0 | 0 | 40 | 40 | 0 |
| Fumaric acid | 0.3 | 0.8 | 0.3 | 0.8 | 0.3 | 0.8 | 0 |
| PA-6, low AEG, high flow | 60 | 60 | 60 | 60 | 60 | 60 | 100 |
| Total | 100.3 | 100.8 | 100.3 | 100.8 | 100.3 | 100.8 | 100 |
| PROPERTIES | | | | | | | |
| Heat defl. temp. (° C.) | 182 | 176 | 183 | 185 | 177 | 176 | 156 |
| Notched Izod (kJ/m$^2$) | 4.0 | 4.7 | 4.4 | 4.4 | 3.8 | 3.7 | 4.7 |
| Elastic modulus (MPa) | 2751 | 2772 | 2751 | 2796 | 2810 | 2814 | 2693 |

TABLE 4-continued

|  | Comp. Ex. 14 | Comp. Ex. 15 | Comp. Ex. 16 | Comp. Ex. 17 | Comp. Ex. 18 | Ex. 2 | Comp. Ex. 19 |
|---|---|---|---|---|---|---|---|
| Tensile stress at yield (MPa) | 76 | 79 | 77 | 78 | 77 | 79 | 50 |
| Tensile stress at break (MPa) | 76 | 62 | 70 | 61 | 63 | 59 | 50 |
| Tensile strain at break (%) | 4 | 14 | 8 | 13 | 15 | 14 | 12 |
| Melt flow rate (g/10 min) | 110 | 79 | 103 | 75 | 104 | 71 | — |
| PPE PARTICLE SIZE ($\mu m^2$) | | | | | | | |
| Mean | 2.36 | — | 1.43 | — | — | 0.53 | — |
| Standard Deviation | 10.01 | — | 4.45 | — | — | 0.65 | — |
| PPE particle size ($\mu m^2$) cutoff, reported at, x % of particle population | | | | | | | |
| 97.5% are smaller than | 13.02 | — | 7.82 | — | — | 2.27 | — |
| 99.0% are smaller than | 19.58 | — | 15.00 | — | — | 3.20 | — |
| 99.5% are smaller than | 32.65 | — | 27.71 | — | — | 4.71 | — |

Examples 3 and 4, Comparative Examples 20-22

These examples illustrate fiber production. Five compositions were prepared by blending the components and amounts summarized in Table 5. The composition of Example 4 was prepared by blending a composition prepared according to Example 3 with an equal quantity of the polyamide in a second run through the extruder.

Micrographs corresponding to Examples 3 and 4, and Comparative Examples 20 and 21 are presented in FIGS. 14-17, respectively. Image analysis was done using commercially available software Clemex Vision PE and Vision Lite 6.0 and FIGS. 14-17 were colored for illustration, with red signifying the polyamide-containing continuous phase, and blue signifying the polyphenylene ether-containing disperse phase. Polyphenylene ether particle size was plotted using Minitab software, version 15, from Minitab, Inc. The compositions of Examples 3 and 4 had finely divided polyphenylene ether disperse phases, while the compositions of Comparative Examples 20 and 21 had coarsely divided polyphenylene ether disperse phases.

TABLE 5

|  | Ex. 3 | Ex. 4 | Comp. Ex. 20 | Comp. Ex. 21 | Comp. Ex. 22 |
|---|---|---|---|---|---|
| COMPOSITIONS | | | | | |
| PPE, 0.30 | 40 | 20 | 40 | 20 | 0 |
| Fumaric acid | 0.8 | 0.4 | 0.3 | 0.3 | 0 |
| PA-6,6, low AEG, high flow | 60 | 80 | 60 | 80 | 100 |
| Total | 100.8 | 100.4 | 100.3 | 100.3 | 100.0 |
| PPE PARTICLE SIZE ($\mu M^2$) | | | | | |
| Mean | 0.68 | 0.51 | 0.61 | 0.93 | — |
| Standard Deviation | 0.76 | 0.41 | 0.81 | 1.93 | — |
| PPE particle size cutoff, reported at, x % of particle population | | | | | |
| 97.5% are smaller than | 2.62 | 1.58 | 2.62 | 5.29 | — |
| 99.0% are smaller than | 3.81 | 2.04 | 4.25 | 10.67 | — |
| 99.5% are smaller than | 4.65 | 2.57 | 5.69 | 17.61 | — |

Figure 13:
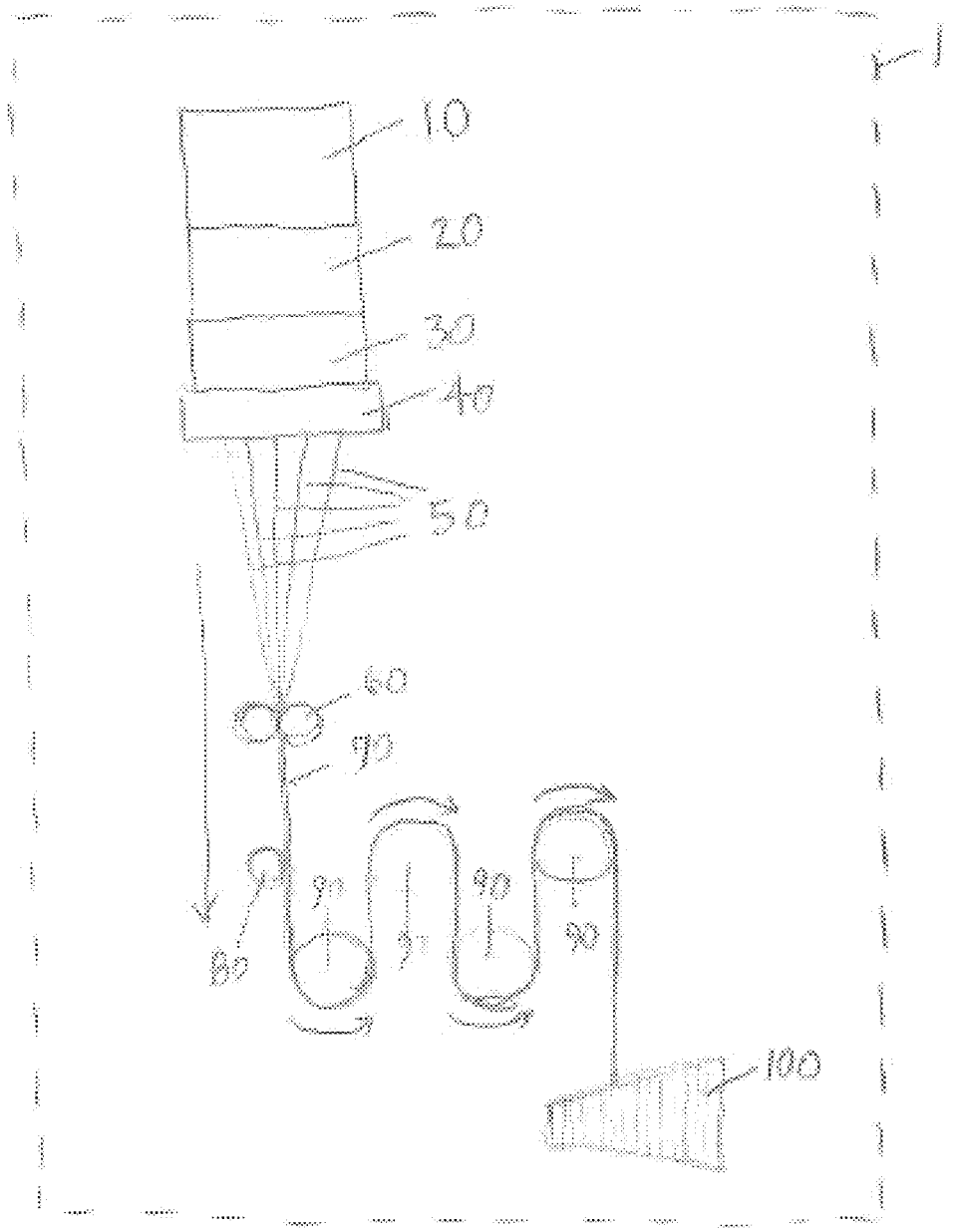
FIG. 13 is a schematic diagram of a fiber spinning apparatus.
Figure 14:
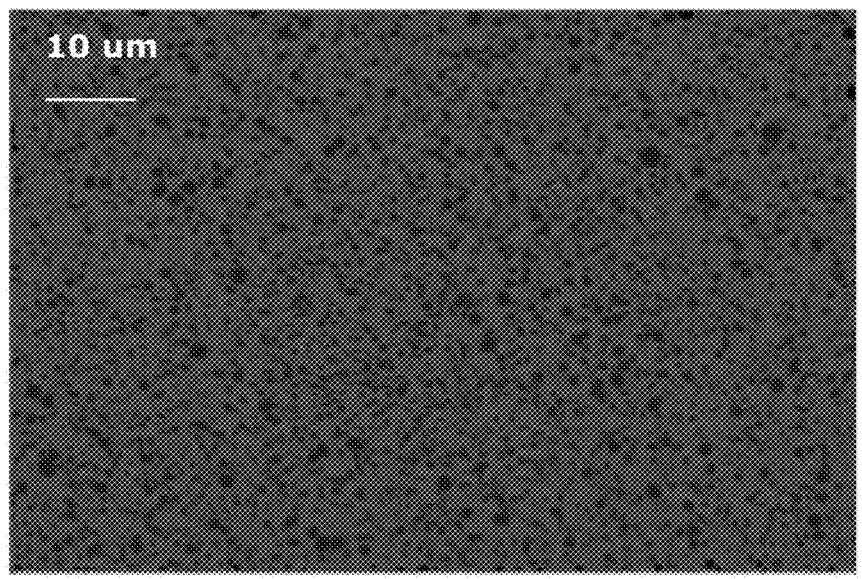
FIG. 14 is an SEM image of the Comparative Example 17 composition, enhanced by image analysis of the polyphenylene ether-containing disperse phase domains.
Figure 15:
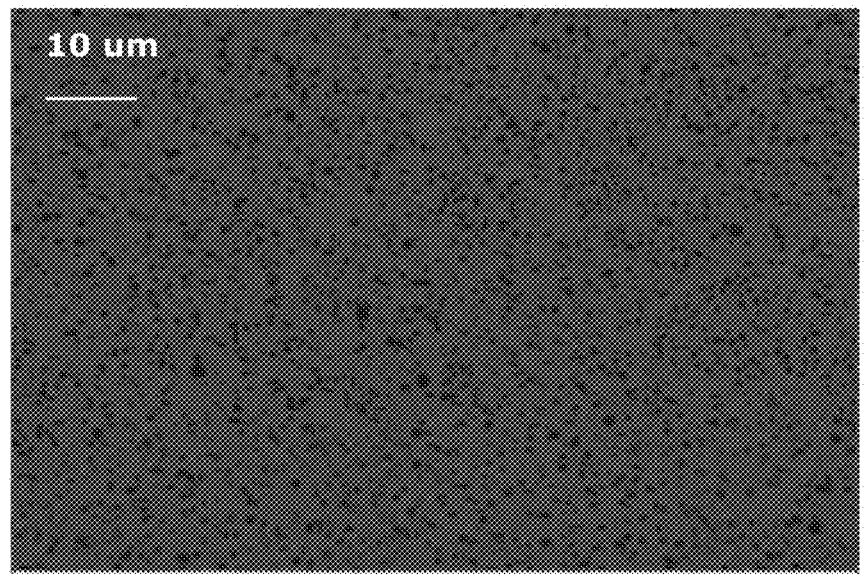
FIG. 15 is an SEM image of the Example 4 composition, enhanced by image analysis of the polyphenylene ether-containing disperse phase domains.
Figure 16:
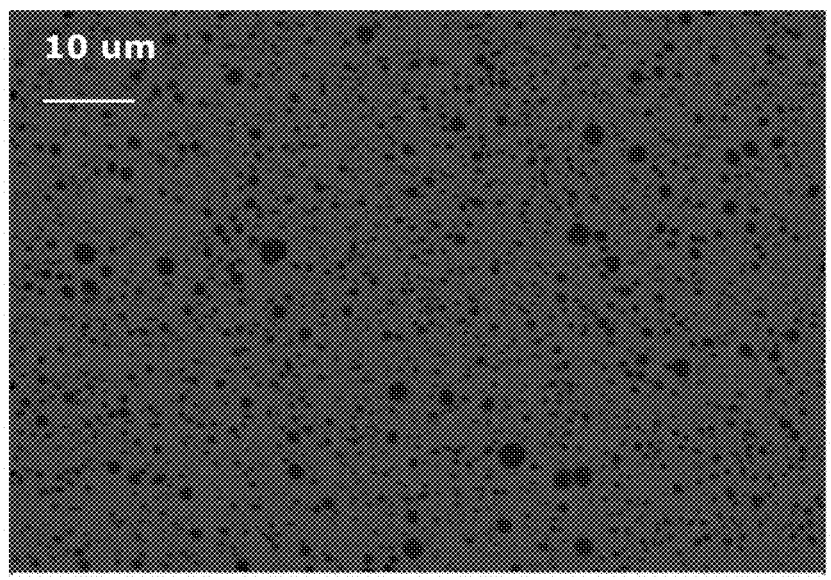
FIG. 16 is an SEM image of the Comparative Example 19 composition, enhanced by image analysis of the polyphenylene ether-containing disperse phase domains.
Figure 17:
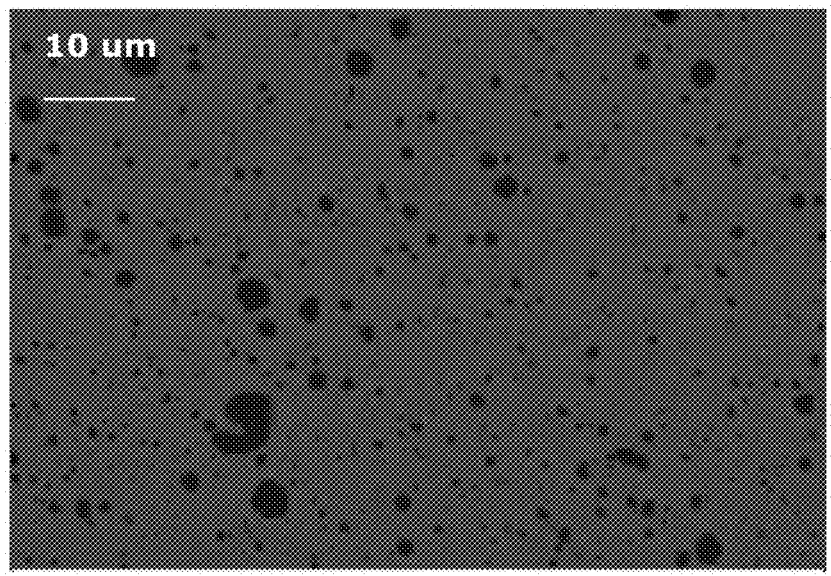
FIG. 17 is an SEM image of the Comparative Example 21 composition, enhanced by image analysis of the polyphenylene ether-containing disperse phase domains.
Figure 18:
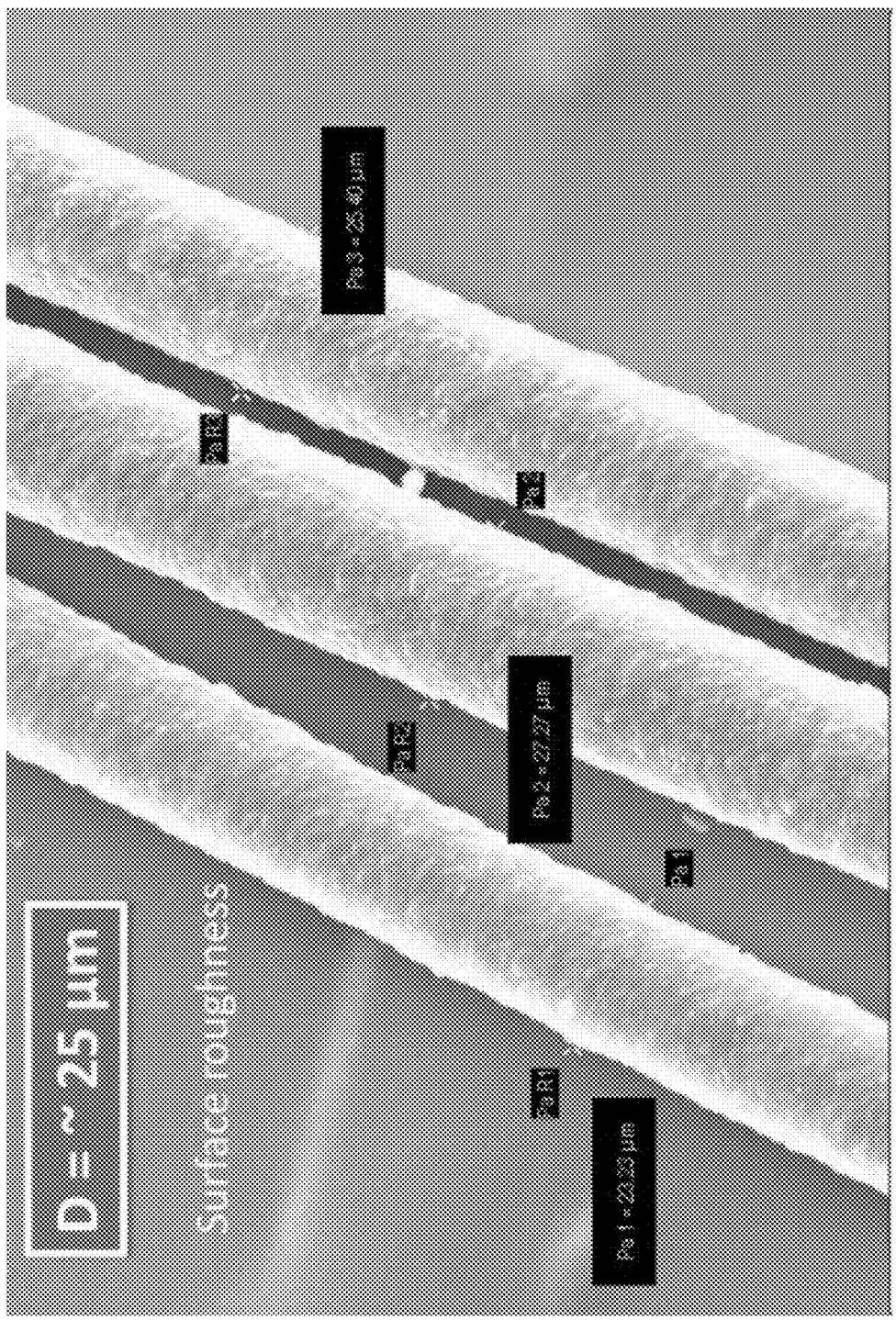
FIG. 18 is an SEM image of the surface of fibers prepared from the Example 4 composition.
Figure 19:
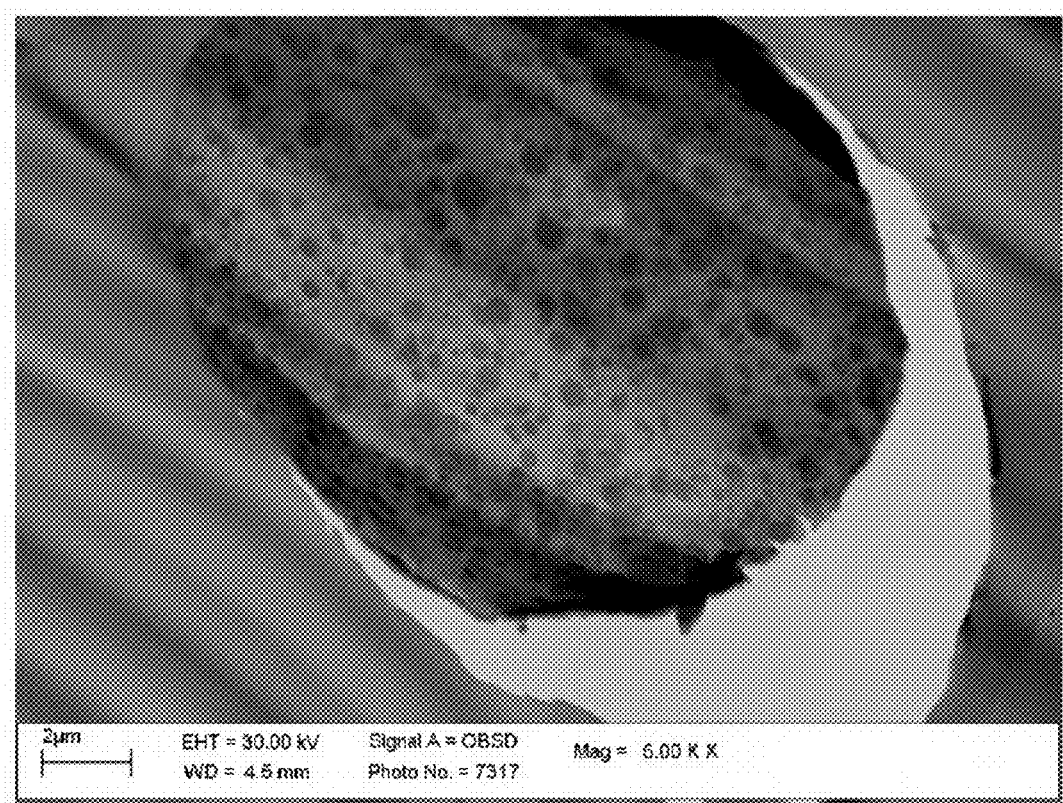
FIG. 19 is a STEM-in-SEM image of a cross-section of a fiber prepared from the Example 4 composition by employing scanning electron transmission microscopy mode in a scanning electron microscope ["STEM-in-SEM"].
Figure 20:
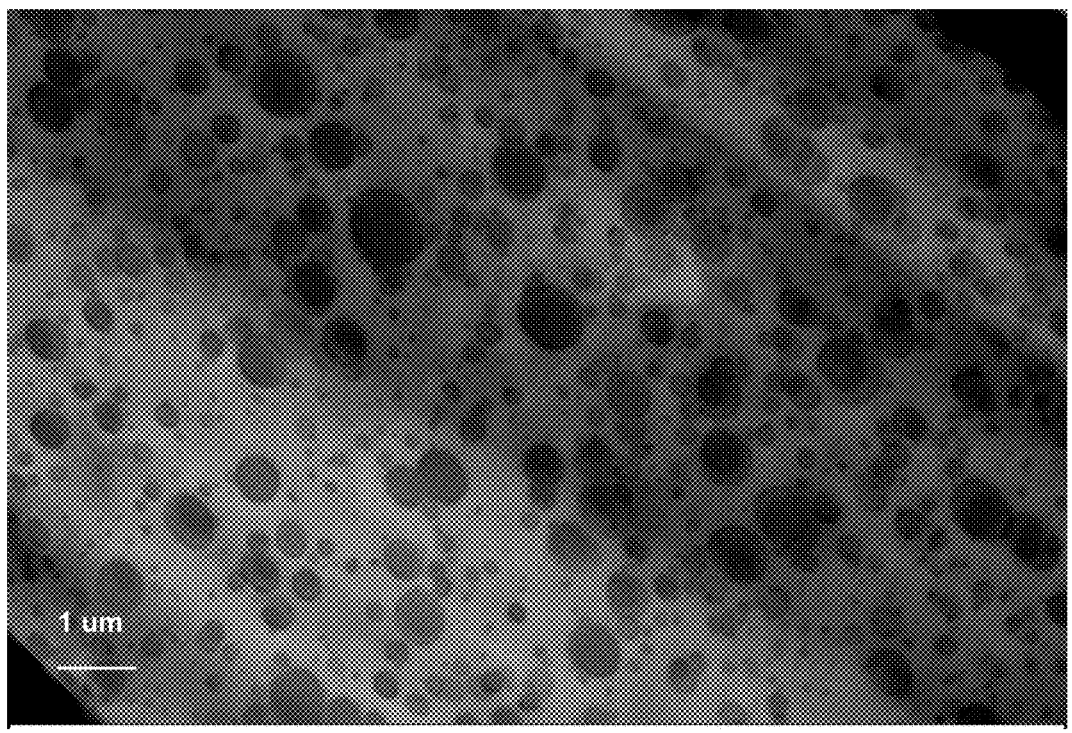
FIG. 20 is a STEM-in-SEM image corresponding to an enlargement of the FIG. 19 image.
Figure 21:
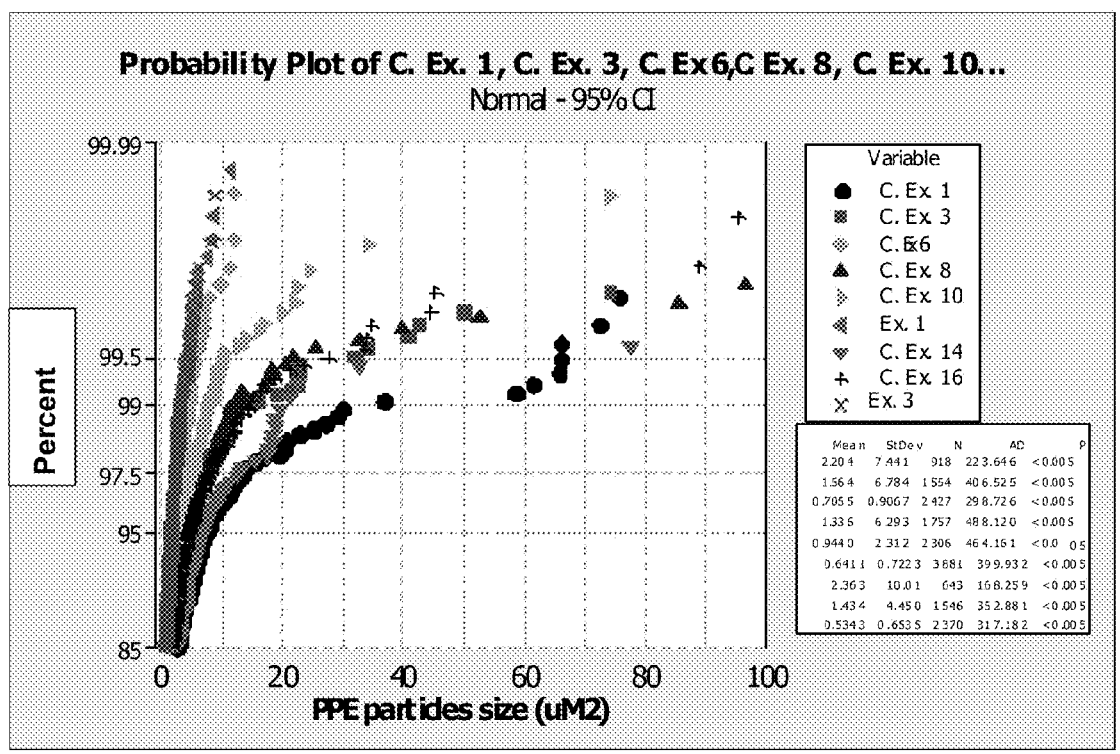
FIG. 21 is a probability plot showing that in the extrudate of Examples 1 and 2 no more than 0.5 percent of the total disperse phase particles have a cross-sectional area of greater than 5.5 micrometer$^2$, while the Comparative Examples contain a greater percentage of particles above this dimension.
Figure 22:
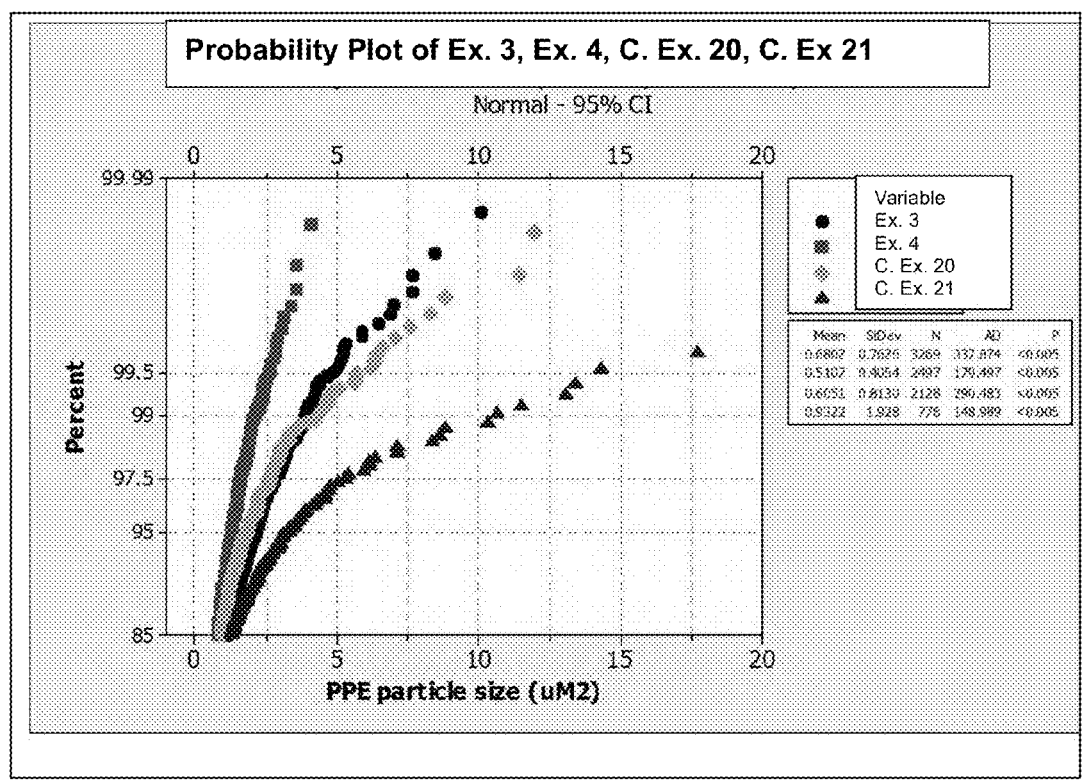
FIG. 22 is a probability plot showing that in the fibers of Examples 3 and 4 no more than 0.5 percent of the total disperse phase particles have a cross-sectional area of greater than 5.5 micrometer$^2$, while the Comparative Examples contain a greater percentage of particles above this dimension.

Fibers were produced on a Hills, Inc. (West Melbourne, Fla., USA), Model GHP bi-component pilot fiber line, with a 1.25 inch diameter extrusion screw, a 2:1 compression ratio, and a spinneret having 144 die holes of 0.60 millimeter diameter. The screen pack had five layers, with 325 mesh (44 micrometer opening) as the finest screen. FIG. 13 is a schematic diagram of a fiber spinning apparatus 1 comprising an extruder 10 that prepares a molten polyamide-polyphenylene ether blend; a metering pump 20 that meters the flow of the molten polyamide-polyphenylene ether blend from the extruder; a filter pack 30 that removes from the molten polyamide-polyphenylene ether blend insoluble particles with the potential to interfere with fiber spinning; spinneret 40 through which individual fibers (or monofilaments) 50 are extruded; convergence guide 60 which combines individual fibers 50 to form a yarn 70; finish applicator 80 which can, optionally, apply a finish to the yarns (in these experiments no finish was applied to the yarns); drawing godets 90 to lengthen the yarn; and bobbin 100 to gather the lengthened yarn. The fibers thus obtained were evaluated according to the tests reported in Table 6.

Denier Per Filament (dpf) is a measure of the mass of a 9,000 meter long individual filament or individual staple fiber if it were continuous. The dpf is determined by dividing the yarn denier by the number of filaments in the yarn. Denier per filament was determined by winding the fiber bundle onto a 1 meter circumference wheel for 90 revolutions. This sample is weighed in grams, multiplied by 100 and then divided by the number of fibers in the bundle, 144, to determine the dpf.

Draw ratio—While extruded fibers are solidifying, or in some cases even after they have hardened, the filaments may be drawn to impart strength. Drawing pulls the molecular chains together and orients them along the fiber axis, creating a considerably stronger yarn. The draw ratio is expressed as (final length after the draw: the initial length before the draw).

Maximum load—This is the load measured when the slope of the stress strain curve is zero. This is generated using an Instron 5500 Series Electromechanical Testing System with the Tensile stress strain curve and properties generated using the Intron Bluehill analysis system. The units are in grams force.

Tenacity is the maximum specific strength of a fiber or yarn that is developed in a tensile test taken to rupture point. Here, the objective measure of tenacity is the maximum load divided by the total denier (i.e., load at rupture; expressed in grams per denier) for a yarn containing 144 filaments.

Strain at maximum load is defined as the percent elongation of the material at the point of maximum load. This is a unitless number.

The compositions of Examples 3 and 4 could be spun to produce fibers of various dpf, including fibers of less than 10 dpf, which is a typical value for a functional fiber. In contrast, the compositions of Comparative Examples 20 and 21 did not produce fibers of less than 10 dpf. Comparative Example 22 is an all-polyamide fiber included for comparison.

TABLE 6

|  | Dpf (g/9000 m) | Draw Ratio | Max Load (gF) | Tenacity (g/den) | Strain at Max Load (%) |
|---|---|---|---|---|---|
| Ex. 3 | 15.1 | 1.0 | 1202 | 0.6 | 4.5 |
|  | 7.8 | 1.0 | 579 | 0.5 | 4.4 |
|  | 7.7 | 1.0 | 544 | 0.3 | 5.4 |
|  | 5.8 | 1.0 | 385 | 0.5 | 5.3 |
|  | 4.7 | 1.4 | 514 | 0.8 | 42.9 |
| Ex. 4 | 4.8 | 1.0 | 645 | 0.9 | 322.6 |
|  | 4.3 | 1.0 | 662 | 1.0 | 289.2 |
|  | 3.5 | 2.2 | 878 | 1.7 | 207.1 |
|  | 1.7 | 1.0 | 295 | 1.2 | 266.5 |
|  | 1.7 | 1.5 | 360 | 1.5 | 125.2 |
| Comp. Ex. 20 | 18.3 | 1.0 | 1179 | 0.4 | 4.0 |
|  | 13.8 | 1.0 | 901 | 0.5 | 5.6 |
|  | 10.7 | 1.3 | 982 | 0.6 | 46.9 |
| Comp. Ex. 21 | 28.0 | 1.0 | 613 | 0.2 | 6.5 |
|  | 16.7 | 1.0 | 229 | 0.1 | 2.5 |
|  | 10.5 | 1.0 | 228 | 0.2 | 4.0 |
| Comp. Ex. 22 | 2.6 | 2.4 | 947 | 2.5 | 59.6 |
|  | 2.6 | 1.0 | 978 | 2.6 | 182.3 |
|  | 2.6 | 2.4 | 1291 | 3.5 | 90.6 |
|  | 2.1 | 1.7 | 1138 | 3.8 | 107.2 |
|  | 0.9 | 1.7 | 516 | 4.2 | 83.3 |
|  | 0.4 | 1.7 | 331 | 5.7 | 75.9 |

Table 7 presents processing data from the fiber spinning experiments conducted with the compositions of Examples 3 and 4, and Comparative Examples 20-22. In Table 7, the temperature values reported out by the thermal couple installed in the machine. The pack pressures were reported by a pressure transducer installed in the die to record the head pressure (pack pressure values in Table 7 are expressed in units of megapascals after conversion from units of pounds per square inch). The melt pump speeds were measured and set and then measured with internal transducers. The Denier, Feed, Stretch, Relax and Winder Rolls are set and confirmed with external tachometers.

Sample preparation for fiber imaging—Fibers were embedded in epoxy EMbed 812 (available from Electron Microscopy Sciences) for 36 hours followed by cryo-microtoming of thin epoxy embedded fibers. The objective of this step is to obtain ~100 nanometer thick sections of the material that are deposited on a 3 millimeter meshed grid. The sections were stained with freshly prepared aqueous solution of Ruthenium tetra-oxide for 45 seconds and imaged in STEM (Scanning Transmission Electron Microscopy) mode of a Scanning Electron Microscope (STEM-in-SEM). Finally the grid was transferred to a STEM-in-SEM holder and loaded into the instrument and the morphology of the material was investigated.

The compositions of Examples 3 and 4 produced fibers having a range of dpf values over an acceptable range of processing parameters such as pack pressure and winding speed. In contrast, the compositions of Comparative Examples 20 and 21 failed to produce fibers having a dpf value less than 10, and they also displayed elevated pack pressure. The runs using the 100% polyamide composition of Comparative Example 22 produced fibers having a wide range of dpf values over an acceptable range of processing parameters. However, the polyamide fibers are expected to exhibit lower heat resistance, higher tensile strength, and higher water absorption than the polyamide-polyphenylene ether fibers.

This experiment demonstrates that the present invention overcomes the processing problems encountered in attempts to spin fibers from polyamide-polyphenylene ether blends. The compositions according to the invention, which have fine domains of polyphenylene ether dispersed in a polyamide continuous phase produce fibers of good strength and surface smoothness. Note that the Comparative Examples have much higher pack pressure than the examples according to the invention during melt spinning. The examples therefore demonstrate an improvement that allows for longer spinning runs without the impeded flow displayed by the Comparative Examples, which produces increased pack pressure. Elevated pack pressure will result in a shutdown of the melt spinning process, either due to automatic machine safeguards, or operator intervention for example due to "slow holes" or other fiber-spinning failure.

TABLE 7

| Sample | DPF | Temp. (° C.) | Pack pressure (psi) | Melt pump speed (rpm) | Denier roll speed (m/min) | Winder Speed |
|---|---|---|---|---|---|---|
| Ex. 3 | 15.1 | 288 | 1100 | 12 | 500 | 500 |
|  | 7.8 | 288 | 1100 | 12 | 1000 | 1000 |
|  | 5.8 | 288 | 1500 | 9 | 1000 | 1000 |
|  | 4.7 | 288 | 1500 | 10 | 1000 | 1400 |
| Ex. 4 | 4.3 | 285 | 800 | 12 | 1600 | 1600 |
|  | 1.7 | 285 | 800 | 4 | 1600 | 1600 |
| Comp. Ex. 20 | 18.3 | 289 | 1900 | 20 | 700 | 700 |
|  | 13.8 | 289 | 1980 | 13 | 600 | 600 |
|  | 10.7 | 289 | 2000 | 13 | 600 | 800 |
| Comp. Ex. 21 | 27.9 | 293 | 1450 | 13 | 300 | 300 |
|  | 16.7 | 293 | — | — | — | — |
|  | 10.5 | 293 | 1750 | 9 | 550 | 550 |
|  | 9.7 (failed) | 293 | — | — | — | — |
|  | 9 (failed) | 293 | — | — | — | — |
|  | 8 (failed) | 293 | — | — | — | — |
| Comp. Ex. 22 | 2.6 | 288 | 450 | 10 | 2400 | 2400 |
|  | 2.6 | 288 | 450 | 10 | 1000 | 2400 |
|  | 2.6 | 288 | 450 | 10 | 1000 | 2400 |
|  | 2.6 | 288 | 450 | 10 | 1000 | 2400 |
|  | 2.1 | 288 | 450 | 10 | 1800 | 3000 |
|  | 0.9 | 288 | 300 | 4 | 1800 | 3000 |
|  | 0.4 | 288 | 240 | 2 | 1800 | 3000 |

All ranges disclosed herein are inclusive of the endpoints, and the endpoints are independently combinable with each other. Each range disclosed herein constitutes a disclosure of any point or sub-range lying within the disclosed range.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:

1. A fiber comprising a compatibilized polyamide-polyphenylene ether blend,
   wherein the compatibilized polyamide-polyphenylene ether blend is the product of melt blending components comprising
      about 40 to about 95 weight percent of a polyamide having a an amine end group concentration of less than or equal to 100 microequivalents per gram,
      about 5 to about 60 weight percent of a polyphenylene ether having an intrinsic viscosity of from about 0.2 to 0.38 deciliter per gram, measured at 25° C. in chloroform, and
      about 0.35 to about 1.2 weight percent of a compatibilizing agent;
   wherein all weight percents are based on the total weight of the polyamide and polyphenylene ether polymers;
   wherein the fiber has a diameter of about 20 micrometers to about 500 micrometers;
   wherein the compatibilized polyamide-polyphenylene ether blend comprises a continuous phase comprising the polyamide, and a disperse phase comprising the polyphenylene ether;
   wherein the mean cross-sectional area of the disperse phase particles is less than or equal to about 0.7 micrometer$^2$, and no more than 0.5 percent of the total disperse phase particles have a cross-sectional area of greater than 5.5 micrometer$^2$, based on the number of disperse phase particles, when measured by scanning transmission electron microscopy;
   wherein the compatibilized polyamide-polyphenylene ether blend is free of any polymer other than the polyamide and the polyphenylene ether; and
   wherein the compatibilized polyamide-polyphenylene ether blend comprises 0 to 0.005 weight percent of electrically conductive fillers.

2. The fiber of claim 1, wherein the polyamide is selected from the group consisting of polyamide-6, polyamide-6,6, and mixtures thereof.

3. The fiber of claim 1, wherein the polyamide comprises polyamide-6,6.

4. The fiber of claim 1, wherein the polyamide has an amine end group concentration of 20 to 100 microequivalents per gram.

5. The fiber of claim 1, wherein the melt blended components comprise the polyamide in an amount of about 50 to about 90 weight percent and the polyphenylene ether in an amount of about 10 to about 50 weight percent.

6. The fiber of claim 1, wherein the polyphenylene ether comprises poly(2,6-dimethyl-1,4-phenylene ether) having an intrinsic viscosity of from about 0.24 to about 0.35 deciliter per gram.

7. The fiber of claim 1, wherein the melt blended components comprise the compatibilizing agent in an amount of about 0.4 to about 1.1 weight percent.

8. The fiber of claim 1, wherein the compatibilizing agent comprises fumaric acid.

9. The fiber of claim 1, wherein no more than 0.5 percent of the total disperse phase particles have a cross-sectional area of greater than 4.5 micrometer$^2$ when measured by scanning transmission electron microscopy.

10. A fiber comprising a compatibilized polyamide-polyphenylene ether blend,
    wherein the compatibilized polyamide-polyphenylene ether blend is the product of melt blending components comprising
       about 50 to about 89.5 weight percent of a polyamide having an amine end group concentration of less than or equal to 100 microequivalents per gram,
       about 10 to about 49.5 weight percent of a polyphenylene ether, and
       about 0.35 to about 1.0 weight percent of a compatibilizing agent comprising fumaric acid;
    wherein all weight percents are based on the total weight of the polyamide and polyphenylene ether polymers;
    wherein the polyamide is selected from the group consisting of polyamide-6, polyamide-6,6, and mixtures thereof;
    wherein the polyamide has an amine end group concentration of less than or equal to 100 microequivalents per gram;
    wherein the polyphenylene ether comprises poly(2,6-dimethyl-1,4-phenylene ether) having an intrinsic viscosity of about 0.24 to about 0.35 deciliter per gram, measured at 25° C. in chloroform;
    wherein the fiber has a diameter of about 20 micrometers to about 500 micrometers;
    wherein the compatibilized polyamide-polyphenylene ether blend comprises a continuous phase comprising the polyamide, and a disperse phase comprising the polyphenylene ether;
    wherein the mean cross-sectional area of the disperse phase particles is less than or equal to about 0.7 micrometer$^2$, and no more than 0.5 percent of the total disperse phase particles have a cross-sectional area of greater than 5.5 micrometer$^2$, based on the number of disperse phase particles, when measured by scanning transmission electron microscopy;
    wherein the compatibilized polyamide-polyphenylene ether blend is free of any polymer other than the polyamide and the polyphenylene ether; and
    wherein the compatibilized polyamide-polyphenylene ether blend comprises 0 to 0.005 weight percent of electrically conductive fillers.

11. A core/sheath fiber comprising:
    a core comprising the fiber of claim 1; and
    a sheath substantially surrounding the core, wherein the sheath comprises a second polyamide and is substantially free of polyphenylene ether.

12. A core/sheath fiber comprising:
    a core comprising the fiber of claim 10; and
    a sheath substantially surrounding the core, wherein the sheath comprises a second polyamide and is substantially free of polyphenylene ether.

13. A core/sheath fiber comprising:
    a core comprising a polyamide and being substantially free of polyphenylene ether; and
    a sheath substantially surrounding the core and comprising a compatibilized polyamide-polyphenylene ether blend;
    wherein the compatibilized polyamide-polyphenylene ether blend is the product of melt blending components comprising
       about 40 to about 95 weight percent of a polyamide having an amine end group concentration of less than or equal to 100 microequivalents per gram,
       about 5 to about 60 weight percent of a polyphenylene ether having an intrinsic viscosity of about 0.2 to 0.38 deciliter per gram, measured at 25° C. in chloroform, and
       about 0.35 to about 1.2 weight percent of a compatibilizing agent,
    wherein all weight percents are based on the total weight of the polyamide and polyphenylene ether polymers;

wherein the fiber has a diameter of about 20 micrometers to about 500 micrometers;

wherein the compatibilized polyamide-polyphenylene ether blend comprises a continuous phase comprising the polyamide, and a disperse phase comprising the polyphenylene ether;

wherein the mean cross-sectional area of the disperse phase particles is less than or equal to about 0.7 micrometer$^2$, and no more than 0.5 percent of the total disperse phase particles have a cross-sectional area of greater than 5.5 micrometer$^2$, based on the number of disperse phase particles, when measured by scanning transmission electron microscopy;

wherein the compatibilized polyamide-polyphenylene ether blend is free of any polymer other than the polyamide and the polyphenylene ether; and wherein the compatibilized polyamide-polyphenylene ether blend comprises 0 to 0.005 weight percent of electrically conductive fillers.

14. A core/sheath fiber comprising:
a core comprising a polyamide and being substantially free of polyphenylene ether; and
a sheath substantially surrounding the core and comprising a compatibilized polyamide-polyphenylene ether blend;
wherein the compatibilized polyamide-polyphenylene ether blend is the product of melt blending components comprising
   about 50 to about 89.5 weight percent of a polyamide having an amine end group concentration of less than or equal to 100 microequivalents per gram,
   about 10 to about 49.5 weight percent of a polyphenylene ether having an intrinsic viscosity of about 0.24 to about 0.35 deciliter per gram, measured at 25° C. in chloroform, and
   about 0.35 to about 1 weight percent of a compatibilizing agent;
wherein all weight percents are based on the total weight of the polyamide and polyphenylene ether polymers;
wherein the polyamide is selected from the group consisting of polyamide-6, polyamide-6,6, and mixtures thereof;
wherein the polyamide has an amine end group concentration of less than or equal to 100 microequivalents per gram;
wherein the fiber has a diameter of about 20 micrometers to about 500 micrometers;
wherein the compatibilized polyamide-polyphenylene ether blend comprises a continuous phase comprising the polyamide, and a disperse phase comprising the polyphenylene ether;
wherein the mean cross-sectional area of the disperse phase particles is less than or equal to about 0.7 micrometer$^2$, and no more than 0.5 percent of the total disperse phase particles have a cross-sectional area of greater than 5.5 micrometer$^2$, based on the number of disperse phase particles, when measured by scanning transmission electron microscopy;
wherein the compatibilized polyamide-polyphenylene ether blend is free of any polymer other than the polyamide and the polyphenylene ether; and
wherein the compatibilized polyamide-polyphenylene ether blend comprises 0 to 0.005 weight percent of electrically conductive fillers.

15. A method of melt spinning a fiber, comprising:
melt extruding a compatibilized polyamide-polyphenylene ether blend to form a fiber;
wherein the compatibilized polyamide-polyphenylene ether blend is the product of melt blending components comprising
   about 40 to about 95 weight percent of a polyamide having an amine end group concentration of less than or equal to 100 microequivalents per gram,
   about 5 to about 60 weight percent of a polyphenylene ether having an intrinsic viscosity of about 0.2 to about 0.38 deciliter per gram, measured at 25° C. in chloroform, and
   about 0.35 to about 1.2 weight percent of a compatibilizing agent;
wherein all weight percents are based on the total weight of the polyamide and polyphenylene ether polymers;
wherein the fiber has a diameter of about 20 micrometers to about 500 micrometers;
wherein the compatibilized polyamide-polyphenylene ether blend comprises a continuous phase comprising the polyamide, and a disperse phase comprising the polyphenylene ether;
wherein the mean cross-sectional area of the disperse phase particles is less than or equal to about 0.7 micrometer$^2$, and no more than 0.5 percent of the total disperse phase particles have a cross-sectional area of greater than 5.5 micrometer$^2$, based on the number of disperse phase particles, when measured by scanning transmission electron microscopy;
wherein the compatibilized polyamide-polyphenylene ether blend is free of any polymer other than the polyamide and the polyphenylene ether; and
wherein the compatibilized polyamide-polyphenylene ether blend comprises 0 to 0.005 weight percent of electrically conductive fillers.

16. The method of claim 15, wherein the polyamide is selected from the group consisting of polyamide-6, polyamide-6,6.

17. The method of claim 15, wherein the polyamide comprises polyamide-6,6.

18. The method of claim 15, wherein the melt blended components comprise the polyamide in an amount from about 50 to about 90 weight percent and the polyphenylene ether in an amount of about 10 to about 50 weight percent.

19. The method of claim 15, wherein the polyphenylene ether comprises poly(2,6-dimethyl-1,4-phenylene ether) having an intrinsic viscosity of from about 0.24 to about 0.35 deciliter per gram.

20. The method of claim 15, wherein the melt blended components comprise the compatibilizing agent in an amount from about 0.5 to about 1.0 weight percent.

21. The method of claim 15, wherein the compatibilizing agent comprises fumaric acid.

22. A method of melt spinning a fiber, comprising:
melt extruding a compatibilized polyamide-polyphenylene ether blend to form a fiber;
wherein the compatibilized polyamide-polyphenylene ether blend is the product of melt blending components comprising
   about 50 to about 89.5 weight percent of a polyamide,
   about 10 to about 49.5 weight percent of a polyphenylene ether, and
   about 0.35 to about 1 weight percent of a compatibilizing agent selected from the group consisting of citric acid, fumaric acid, maleic acid, and mixtures thereof;
wherein all weight percents are based on the total weight of the polyamide and polyphenylene ether polymers;

wherein the polyamide is selected from the group consisting of polyamide-6, polyamide-6,6, and mixtures thereof;

wherein the polyamide has an amine end group concentration of less than or equal to 100 micro equivalents per gram;

wherein the polyphenylene ether is poly(2,6-dimethyl-1,4-phenylene ether) having an intrinsic viscosity of about 0.24 to about 0.35 deciliter per gram, measured at 25° C. in chloroform;

wherein the fiber has a diameter of about 20 micrometers to about 500 micrometers;

wherein the compatibilized polyamide-polyphenylene ether blend comprises a continuous phase comprising the polyamide, and a disperse phase comprising the polyphenylene ether;

wherein the mean cross-sectional area of the disperse phase particles is less than or equal to about 0.7 micrometer$^2$, and no more than 0.5 percent of the total disperse phase particles have a cross-sectional area of greater than 5.5 micrometer$^2$, based on the number of disperse phase particles, when measured by scanning transmission electron microscopy;

wherein the compatibilized polyamide-polyphenylene ether blend is free of any polymer other than the polyamide and the polyphenylene ether; and wherein the compatibilized polyamide-polyphenylene ether blend comprises 0 to 0.005 weight percent of electrically conductive fillers.

23. A textile comprising the fiber of claim 1.

* * * * *